(12) United States Patent
Griffiths et al.

(10) Patent No.: US 11,551,366 B2
(45) Date of Patent: Jan. 10, 2023

(54) SYSTEM AND METHODS FOR CORRECTING TERRAIN ELEVATIONS UNDER FOREST CANOPY

(71) Applicant: Intermap Technologies, Inc., Englewood, CO (US)

(72) Inventors: Stephen Griffiths, Englewood, CO (US); Natalie Findlay, Calgary (CA); Carolyn Johnston, Lafayette, CO (US)

(73) Assignee: Intermap Technologies, Inc., Englewood, CO (US)

( * ) Notice: Subject to any disclaimer, the term of this patent is extended or adjusted under 35 U.S.C. 154(b) by 37 days.

(21) Appl. No.: 17/193,277

(22) Filed: Mar. 5, 2021

(65) Prior Publication Data
US 2022/0284605 A1 Sep. 8, 2022

(51) Int. Cl.
*G06T 7/33* (2017.01)
*G06T 7/35* (2017.01)
(Continued)

(52) U.S. Cl.
CPC .......... *G06T 7/337* (2017.01); *G01S 13/9023* (2013.01); *G06T 7/0012* (2013.01);
(Continued)

(58) Field of Classification Search
CPC .. G06T 7/337; G06T 7/55; G06T 7/35; G06T 7/0012; G06T 2207/10028;
(Continued)

(56) References Cited

U.S. PATENT DOCUMENTS

| 5,109,430 A | 4/1992 | Nishihara |
| 5,187,754 A | 2/1993 | Currin |

(Continued)

FOREIGN PATENT DOCUMENTS

| WO | WO2008034465 A1 | 3/2008 |
| WO | WO2010056643 A2 | 5/2010 |

OTHER PUBLICATIONS

Final Office Action in U.S. Appl. No. 16/664,696, dated Jan. 24, 2022, 33 pages.
(Continued)

*Primary Examiner* — Manav Seth
(74) *Attorney, Agent, or Firm* — Perkins Coie LLP

(57) ABSTRACT

Systems and methods of automating the generation of a correction of an estimate of an elevation of a digital elevation model (DEM) of the bare earth under forest canopy. The disclosed embodiments facilitate generation of a more accurate DEM in areas of canopy coverage (where the input X-band DSM cannot see the ground) to estimate both the canopy height and the associated DEM. In some embodiments, the result of computationally correcting an estimate of an original DEM is a modified DEM. The method of correcting an estimate of an original DEM utilizes a pair of P-band radar images, an original DEM overlapping the same scene as the P-band radar images, at least one common, uniquely-identifiable point in the P-band radar images, and a definition of a geographical area surrounding the common, uniquely identifiable point over which the elevation correction is applicable.

20 Claims, 18 Drawing Sheets

(51) Int. Cl.
   *G06T 7/00* (2017.01)
   *G06T 7/55* (2017.01)
   *G01S 13/90* (2006.01)
   *G06V 20/10* (2022.01)

(52) U.S. Cl.
   CPC .............. *G06T 7/35* (2017.01); *G06T 7/55* (2017.01); *G06V 20/182* (2022.01); *G06V 20/188* (2022.01); *G06T 2207/10028* (2013.01); *G06T 2207/10044* (2013.01); *G06T 2207/30188* (2013.01)

(58) Field of Classification Search
   CPC .......... G06T 2207/10044; G06T 2207/30188; G06V 20/188; G06V 20/182; G01S 13/9023
   See application file for complete search history.

(56) References Cited

U.S. PATENT DOCUMENTS

| | | |
|---|---|---|
| 5,926,581 A | 7/1999 | Pritt |
| 6,272,448 B1 | 8/2001 | Ishii |
| 6,448,544 B1 | 9/2002 | Stanton |
| 6,757,445 B1* | 6/2004 | Knopp .................. G01C 11/06 382/296 |
| 6,792,684 B1 | 9/2004 | Hyyppa |
| 6,937,775 B2 | 8/2005 | Gindele |
| 6,973,218 B2 | 12/2005 | Alderson |
| 6,978,050 B2 | 12/2005 | Hunter |
| 7,013,235 B2* | 3/2006 | Hyyppa ................ A01G 23/00 702/155 |
| 7,043,090 B2 | 5/2006 | Gindele |
| 7,116,838 B2 | 10/2006 | Gindele |
| 7,187,452 B2 | 3/2007 | Jupp |
| 7,236,649 B2 | 6/2007 | Fenney |
| 7,386,164 B2 | 6/2008 | Shragai |
| 7,627,491 B2 | 12/2009 | Feyen |
| 7,639,842 B2 | 12/2009 | Kelle |
| 7,856,312 B2 | 12/2010 | Coombes |
| 7,881,913 B2 | 2/2011 | O'Neil |
| 7,917,292 B1 | 3/2011 | Du |
| 7,917,346 B2 | 3/2011 | Sullivan |
| 8,010,294 B2 | 8/2011 | Dorn |
| 8,139,111 B2 | 3/2012 | Oldroyd |
| 8,208,689 B2* | 6/2012 | Savolainen .......... G01C 11/025 382/110 |
| 8,239,179 B2 | 8/2012 | Duncan |
| 8,295,554 B2 | 10/2012 | Francini et al. |
| 8,369,579 B2 | 2/2013 | Barnes |
| 8,473,264 B2 | 6/2013 | Frigerio |
| 8,543,430 B1 | 9/2013 | Fields et al. |
| 8,615,362 B2* | 12/2013 | Laake ..................... G01V 8/00 702/5 |
| 8,655,595 B1 | 2/2014 | Green et al. |
| 8,718,393 B2* | 5/2014 | Chen ...................... G06T 17/00 382/256 |
| 8,825,456 B2 | 9/2014 | Vasudevan |
| 8,855,439 B2 | 10/2014 | Louis |
| 8,874,187 B2 | 10/2014 | Thomson |
| 9,147,285 B2 | 9/2015 | Kunath |
| 9,245,196 B2* | 1/2016 | Marks .................. G06V 40/10 |
| 9,299,191 B2 | 3/2016 | Sinram et al. |
| 9,418,475 B2* | 8/2016 | Medioni ................ G06T 7/00 |
| 9,436,987 B2* | 9/2016 | Ding ..................... G06T 15/10 |
| 9,589,362 B2* | 3/2017 | Sarkis ................... G06T 17/00 |
| 9,830,690 B2 | 11/2017 | Chiang |
| 9,866,815 B2* | 1/2018 | Vrcelj .................... G06T 7/12 |
| 9,875,554 B2 | 1/2018 | Imber |
| 9,904,867 B2* | 2/2018 | Fathi ................... G06V 20/647 |
| 9,911,242 B2* | 3/2018 | Sundaresan ............. H04N 1/60 |
| 9,912,862 B2* | 3/2018 | Peruch ............... G01B 11/2545 |
| 10,002,407 B1 | 6/2018 | Mercer |
| 10,078,913 B2* | 9/2018 | Rondao Alface .... H04N 13/239 |
| 10,147,057 B2 | 12/2018 | Zhang |
| 10,186,015 B1 | 1/2019 | Mercer |
| 10,204,454 B2 | 2/2019 | Goldman et al. |
| 10,304,203 B2* | 5/2019 | Forutanpour ........... G06T 5/005 |
| 10,325,349 B2 | 6/2019 | Mercer et al. |
| 10,354,411 B2* | 7/2019 | Fu ........................ G01B 11/02 |
| 10,430,641 B2* | 10/2019 | Gao ...................... B60R 11/04 |
| 10,452,789 B2* | 10/2019 | Madmony ............. G06F 30/00 |
| 10,579,875 B2* | 3/2020 | Dal Mutto ............ G06V 10/82 |
| 10,636,209 B1 | 4/2020 | Thaller et al. |
| 10,636,219 B2* | 4/2020 | Steinbrücker ........ G06T 17/205 |
| 10,699,421 B1* | 6/2020 | Cherevatsky .......... G06K 9/623 |
| 10,733,798 B2* | 8/2020 | Wagner ................. G06T 7/246 |
| 10,817,752 B2* | 10/2020 | Kehl ..................... G06N 20/00 |
| 10,825,217 B2* | 11/2020 | Ulusoy .................... G06T 7/11 |
| 10,930,074 B2* | 2/2021 | Fu ....................... G06V 40/165 |
| 10,937,178 B1* | 3/2021 | Srinivasan ............. G06T 7/521 |
| 10,937,188 B2* | 3/2021 | Malisiewicz ............ G06T 7/11 |
| 10,970,518 B1* | 4/2021 | Zhou .................... G06T 15/08 |
| 11,244,189 B2* | 2/2022 | Fathi ..................... G06V 20/64 |
| 2003/0138152 A1 | 7/2003 | Fennye |
| 2004/0260471 A1 | 12/2004 | McDermott |
| 2008/0260237 A1* | 10/2008 | Savolainen .......... G01C 11/025 382/154 |
| 2010/0292973 A1 | 11/2010 | Barnes |
| 2011/0246935 A1 | 10/2011 | Maeder |
| 2011/0295575 A1 | 12/2011 | Levine et al. |
| 2012/0330553 A1 | 12/2012 | Mollaei |
| 2013/0046471 A1 | 2/2013 | Rahmes |
| 2013/0155109 A1 | 6/2013 | Schultz et al. |
| 2013/0197807 A1 | 8/2013 | Du |
| 2013/0342736 A1 | 12/2013 | Numata |
| 2014/0267250 A1 | 9/2014 | Tennant |
| 2014/0301633 A1 | 10/2014 | Furukawa et al. |
| 2015/0046139 A1 | 2/2015 | Iwamura |
| 2015/0154805 A1 | 6/2015 | Hsu |
| 2016/0148347 A1 | 5/2016 | Guido |
| 2016/0196659 A1* | 7/2016 | Vrcelj ..................... G06T 7/50 382/154 |
| 2016/0239924 A1 | 8/2016 | Fields et al. |
| 2016/0366348 A1 | 12/2016 | Dixon |
| 2017/0154127 A1* | 6/2017 | Madmony ........... G06F 16/5854 |
| 2017/0358067 A1 | 12/2017 | Jung |
| 2018/0165616 A1 | 6/2018 | Sun et al. |
| 2019/0108396 A1* | 4/2019 | Dal Mutto ............ G06V 20/52 |
| 2019/0213389 A1* | 7/2019 | Peruch .................... G06T 7/10 |
| 2019/0259202 A1* | 8/2019 | Taubin .................. G06T 17/00 |
| 2020/0134733 A1 | 4/2020 | Maddox |
| 2020/0320327 A1* | 10/2020 | Fathi ..................... G06V 20/70 |
| 2020/0348132 A1 | 11/2020 | Du et al. |
| 2021/0110564 A1 | 4/2021 | Mantey |
| 2021/0118224 A1* | 4/2021 | Zhan ..................... G06T 17/10 |

OTHER PUBLICATIONS

International Search Report and Written Opinion dated Jan. 24, 2022 in International Patent Application No. PCT/US21/54498, 11 pages.

Non-Final Office Action in U.S. Appl. No. 16/664,696, dated Sep. 20. 2021, 26 pages.

Krizhevsky, A. et al., "ImageNet Classification with Deep Convolutional Neural Networks." Jun. 2017, 9 pages.

Non-Final Office Action in U.S. Appl. No. 14/825,806, dated Dec. 1, 2017, 13 pages.

Non-Final Office Action in U.S. Appl. No. 15/963,937, dated May 31, 2018, 10 pages.

Non-Final Office Action in U.S. Appl. No. 16/398,027, dated Aug. 6, 2019, 8 pages.

Notice of Allowance in U.S. Appl. No. 14/825,806, dated Jul. 11, 2018, 12 pages.

Notice of Allowance in U.S. Appl. No. 14/825,806, dated Sep. 4, 2018, 11 pages.

Notice of Allowance in U.S. Appl. No. 15/723,154, dated Jan. 26, 2018, 9 pages.

Notice of Allowance in U.S. Appl. No. 15/963,937, dated Sep. 19, 2018, 8 pages.

Notice of Allowance in U.S. Appl. No. 16/221,859, dated Jan. 29, 2019, 10 pages.

(56) References Cited

OTHER PUBLICATIONS

Notice of Allowance in U.S. Appl. No. 16/398,027, dated Sep. 24, 2019, 7 pages.
Notice of Allowance in U.S. Appl. No. 17/068,214, dated Aug. 16, 2022, 9 pages.
Snavley, N. et al., "Modeling the World from Internet Photo Collections." Int. J. Comput Vis (2008) 80: 189-210.

* cited by examiner

Correct DTM:
Correct point
position

DTM too low:
Point position too
far from image
source

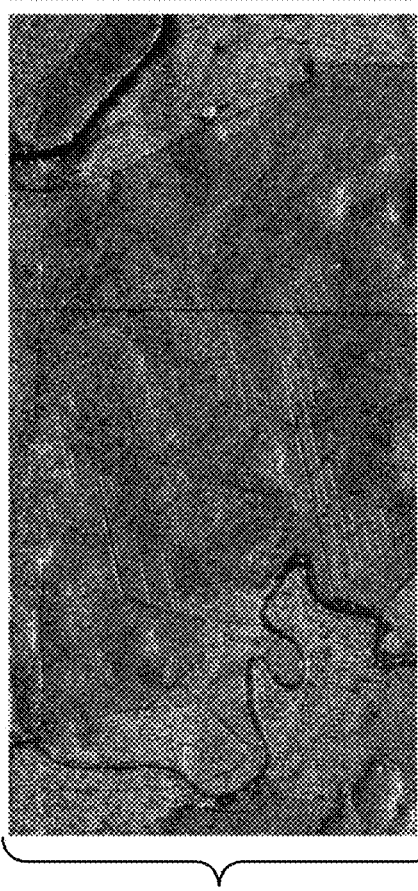
FIG. 17A (Right-look)
FIG. 17B (Left-look)
FIG. 17C (Right-look)
FIG. 17D (Left-look)
Orthorectified to Original DTM
Orthorectified to Modified DTM

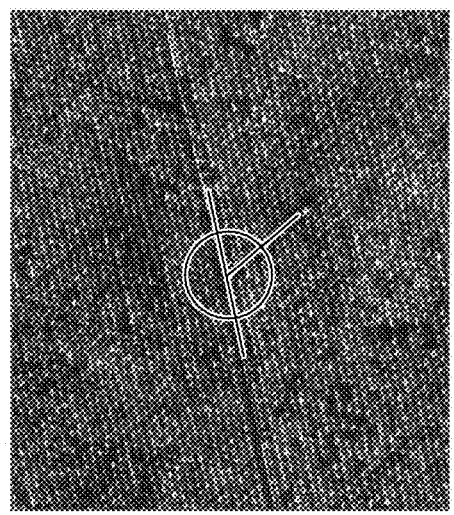
FIG. 19B (Left-look)
FIG. 19D (Left-look)
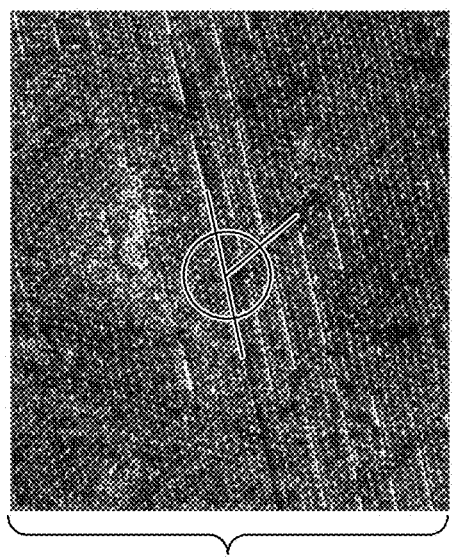
FIG. 19A (Right-look)
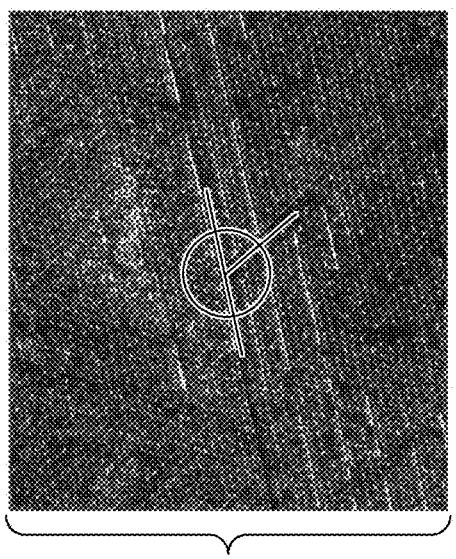
FIG. 19C (Right-look)
Ground Positions Shifted between Left-look and Right-look Images
Ground Positions Aligned between Left-look and Right-look Images
Orthorectified to Original DTM
Orthorectified to Modified DTM

SYSTEM AND METHODS FOR CORRECTING TERRAIN ELEVATIONS UNDER FOREST CANOPY

TECHNICAL FIELD

This disclosure is related to computer-implemented estimating terrain elevations under forest canopy. More particularly, the embodiments disclosed herein are directed at using P-band synthetic aperture radar (SAR) images for applying a correction to an estimate of a digital elevation model elevation of the bare earth under forest canopy.

BACKGROUND

Digital elevation models (DEMs) represent the "bare earth" elevation, from which surface features such as trees and buildings have been removed. Either a digital surface model (DSM) or a digital terrain model (DTM) may be referred to as a DEM. Since no remote sensing mapping system provides direct measurements of the bare earth, a DTM is mostly produced by editing of the DSM. For example, the elevation of the bare earth under a building is easily estimated by measuring the elevation of the ground at points around the building. As another example, the elevation of the bare earth under a forest canopy, which can completely cover a wide area, is usually calculated using independent estimates of the average height of the forest canopy. The elevation under a forest canopy typically employs X-band interferometric synthetic aperture radar (IFSAR) technology. X-band is a relatively short-wavelength radar which backscatters mainly from the small branches and leaves at the tops of trees. Since X-band does not penetrate the trees, under heavy forest canopy, the elevation mapped is that of the tops of trees. As a result, the elevation of a DEM under heavy forest canopy is mostly inaccurate. Thus, there is a need for a better way of estimating the elevation of the bare earth under forest canopy.

BRIEF DESCRIPTION OF THE DRAWINGS

FIGS. 17A-17D show examples of P-band radar images.

FIGS. 19A-19D illustrate a zoomed view of the P-band radar images in FIGS. 17A-17D.

DETAILED DESCRIPTION

Embodiments of the present disclosure are directed at computationally correcting an estimate of an elevation associated with a digital elevation model (such as a DTM or DSM) of the bare earth under forest canopy. By combining interferometry for X-band and leveraging known geometry relationships for two opposite-look, co-incident, P-band radar images, the disclosed technology provides additional input information to estimate the DEM (sub-canopy) terrain surface. Because canopy height estimation and DEM correction are interrelated with one another, one patentable benefit of the disclosed technology is that the highly accurate (e.g., up to a precision of 5 m) bare terrain elevation estimates can be obtained. The disclosed embodiments facilitate generation of a more accurate DEM in areas of canopy coverage (where the input X-band DSM cannot see the ground) to estimate both the canopy height and the associated DEM. The elevation of the DEM at the estimated true map location is regarded as the canopy height. It will be appreciated that in alternate implementations, a correction can be applied to a DSM instead of a DTM. Thus, as used herein, the terms DEM, DSM, DTM can be interchangeably applicable, depending on the specific context.

In some embodiments, the method of correcting an estimate of a DEM utilizes a pair of P-band radar images (e.g., looking at the same terrain from opposing look angles), an original DEM overlapping the same scene as the P-band radar images, at least one common, uniquely identifiable point in the P-band radar images, and a definition of the area surrounding the common, uniquely identifiable point over which the elevation correction is applicable. It will be appreciated that in alternate embodiments canopy-penetrating radar frequencies other than P-band frequencies can be used. Thus, as used herein, the term P-band can apply to a suitable canopy-penetrating radar band, such as the L-band radar frequency. In some embodiments, the result of computationally correcting an estimate of an original DEM is a modified DEM, with points in the defined area adjusted to reflect the correction.

Figure 1:
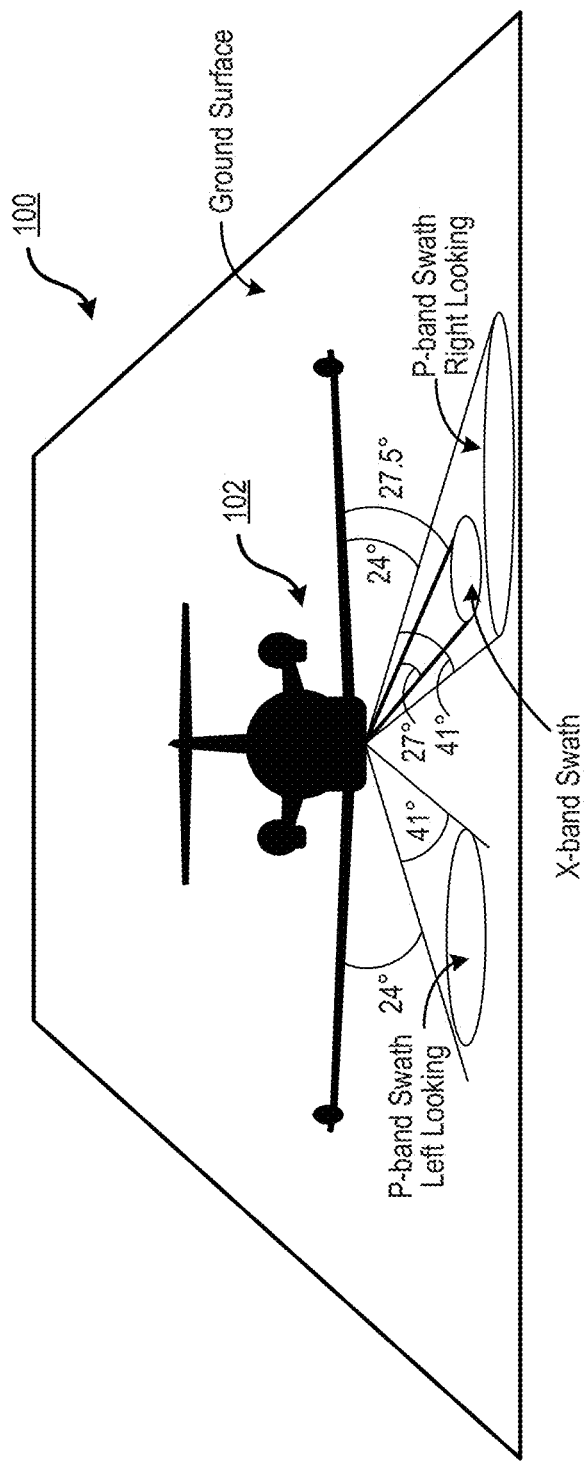
FIG. 1 shows an example of an aerial platform for radar image collection.

FIG. 1 shows an example overview 100 of an aerial platform for radar image collection. In the example shown in FIG. 1, two radar systems are deployed on the aerial platform 102. For example, the aerial platform 102 can be a LearJet equipped with STAR-3 radar systems. In FIG. 1, the rear view of the aerial platform 102 is shown, with the aerial platform 102 equipped with at least two radar systems. The two radar systems can capture X-band and P-band radar images. In accordance with disclosed embodiments, the principal elevation data source (i.e., the data source for generating the original DEM) is based on the X-band interferometric synthetic aperture radar (IFSAR), which provides a highly accurate 5 m digital surface model (DSM) capturing the elevation of the X-band reflective surface. In FIG. 1, the X-band IFSAR is depicted as looking to the right. In alternate embodiments, the X-band IFSAR can also be pivoted on the aerial platform to look to the left. In order to capture X-band IFSAR elevation data over an area of interest, the STAR-3 equipped LearJet can fly along a pattern of strips, collecting image swaths of width up to 11.1 nautical miles across.

Simultaneously while capturing X-band IFSAR data, P-band radar images can be collected using P-band SARs. The two P-band (foliage-penetrating) SARs can have look angles of 25-45 degrees, directly to the left and right of the plane as shown in FIG. 1. While the X-band IFSAR system looks off to one side of the platform, P-band radar images are collected both to the left and the right of the aircraft. Since X-band IFSAR must be collected in adjacent strips, the imaged terrain is collected twice in P-band, once each by the left and right-looking P-band SARs, and from opposite sides. P-band radar is a relatively long-wavelength radar which, in contrast to X-band radar, penetrates past the smallest scatterers at the tops of trees. Most of the P-band radar backscatter, therefore, is generated from reflective objects under the tree canopy, including the trunks of the trees themselves. X-band radar typically captures points only on top of the forest canopy, not off the ground. Because interferometry (for direct DTM generation) at P-band wavelengths is difficult, according to embodiments disclosed herein, X-band IFSARs are used for generating DTMs. It will be understood that the angles depicted in FIG. 1 are solely for purposes of providing an illustrative example. In alternate embodiments, look angles associated with X-band and/or P-band swaths may be different. It will be understood that the aerial platform shown in FIG. 1 is for illustrative purposes. In alternate embodiments, the aerial platform can be a spaceborne system.

Figure 2:
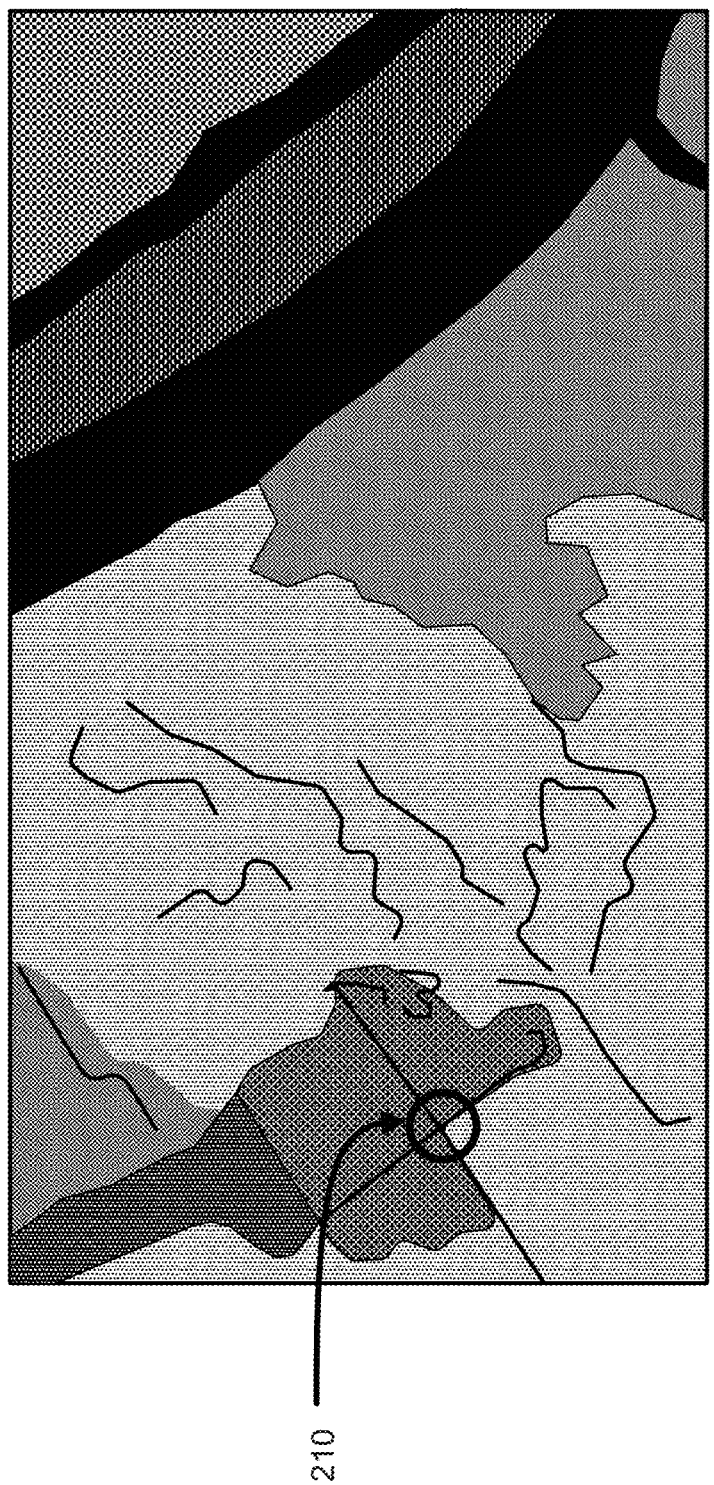
FIG. 2 shows an example of a P-band radar image of a forest.

FIG. 2 shows an example of a P-band radar image of a forest with trail intersection identified. In some embodiments, the trail intersection point (denoted 210 in FIG. 2) can be automatically identified. The trail intersection point shown in FIG. 2 can be regarded as an example of a point that can be identified commonly in two P-band radar images (e.g., captured using the aerial platform shown in FIG. 1). The commonly identifiable point can be used in calculating a correction factor that is used for adjusting an estimate of a DTM elevation. To estimate a ground elevation the commonly identifiable point is located at ground level. For example, the commonly identifiable point may not be along a linear feature such as a road as there can be ambiguity associated with the exact matching position along the road. Uniquely identifiable points are usually identified as corners of the intersection of two roads or trails. Intersections of roads may be identified automatically by using dark linear feature detectors (roads are typically dark in SAR images) and identifying intersections of extracted features. In some embodiments, the position of the uniquely identifiable point can be further refined for higher precision.

In some embodiments, the 2 P-band radar images can be either pre-orthorectified (also termed as "slant range") or orthorectified images. Orthorectification to a DEM is a standard process in earth imaging, in which the map (geographic or projected) coordinates of each pixel in an image of the earth are identified with the aid of a source DEM. This allows the formation of a new image. As a result of applying orthorectification, one or more pixels in the new image can be placed in its/their correct position(s) with respect to map coordinates. However, in the orthorectification process, errors in the DEM can lead to errors in the placement of the pixel in map coordinates.

Figure 3:
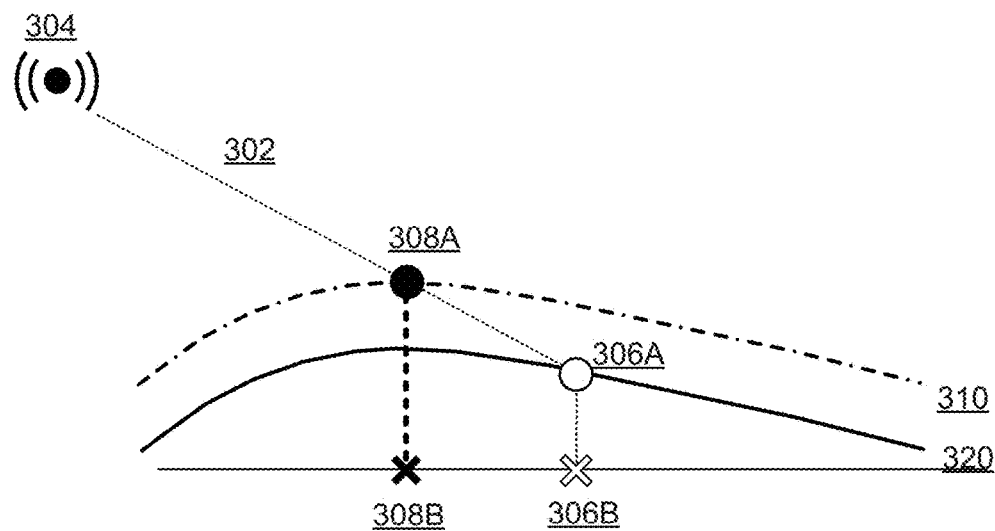
FIG. 3 shows an example of a simplified, 2-D geometry of orthorectification to a DTM.

FIG. 3 shows an example of a simplified, 2-D geometry of orthorectification applied to a DTM. The example in FIG. 3 demonstrates incorrect placement of pixels in the orthorectification process as a result of an incorrect DTM, which is too high for the correct DTM surface. For purposes of this disclosure, an original DTM and an incorrect DTM can be regarded as generally synonymous. Each pixel in the image being orthorectified is associated with a ray (such as ray 302) coming from the P-band imaging radar 304 at the upper left. The orthorectification process places an image pixel associated with the ray at the x-coordinate of the location where it intersects the DTM surface. FIG. 3 illustrates two DTM surfaces, for example, a correct DTM surface 320 and an incorrect DTM surface 310. Incorrect DTM surface 310 is at a higher level than the correct DTM surface 320. Point 306B is the correct placement (or, alignment) of image pixel 306A on the x-coordinate. However, point 308B is an incorrect placement of image pixel 308A on the x-coordinate. Thus, it will be appreciated that if errors in DEM result in an incorrect DTM surface 310 being selected instead of correct DTM surface 320, errors in the placement of the pixel in x-coordinates can occur. From FIG. 3, it can be appreciated that selecting the correct DTM can lead to correct placement (or, alignment) of pixels. However, selecting an incorrect DTM can lead to incorrect placement of pixels. An incorrect DTM surface (such as DTM surface 310) results in placement of a point (such as point 308A) on the incorrect DTM surface 310 too close to the image source (e.g., radar 304). In other words, if the DTM has a higher elevation overall than it should, this will result in assigning a pixel to a position that is shifted too close to the imaging source. Lowering the DTM to the correct height pushes the P-band radar image points away from the sensor such that they line up (e.g., in both the right- and left-look P-band radar images).

Figure 4:
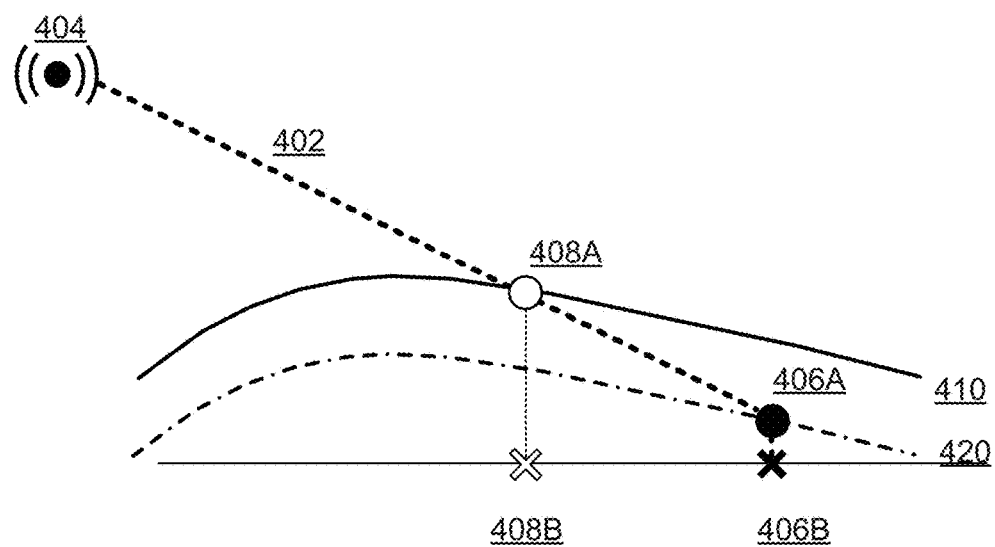
FIG. 4 shows another example of a simplified, 2-D geometry of orthorectification to a DTM.

FIG. 4 shows another example of a simplified, 2-D geometry of orthorectification applied to a DTM. The example in FIG. 4 demonstrates incorrect placement of pixels in the orthorectification process as a result of an incorrect DTM, which is too low for the correct DTM surface. If the (incorrect) DTM surface 420 has a lower elevation than it should with respect to the correct DTM surface 410, the ray 402 coming from an image pixel will intersect the incorrect DTM surface 420 at location 406A. The pixel 406A will be assigned to the location 406B on the X-axis, which is an incorrect location. Thus, if the DTM has a lower elevation overall than it should, this will result in assigning a pixel to a position that is shifted too far away from the imaging source (such as radar 404). FIG. 4 also shows the image pixel 408A (on correct DTM surface 410) will correspond to point 408B on the X-axis, which is the correct location.

Figure 5:
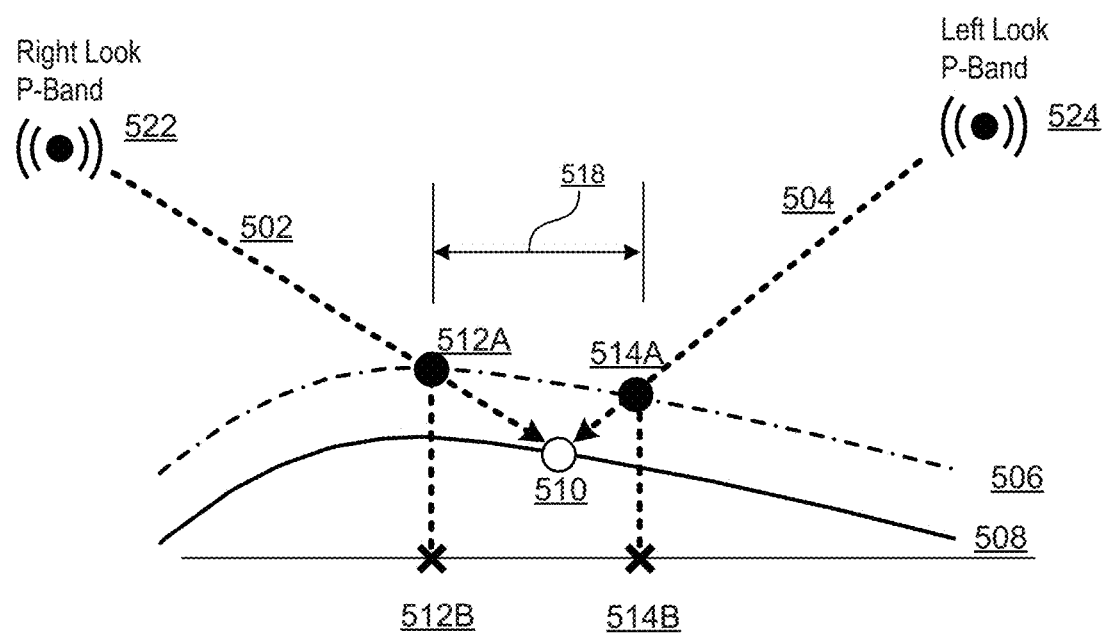
FIG. 5 shows yet another example of a simplified, 2-D geometry of orthorectification to a DTM.

FIG. 5 shows yet another example of a simplified, 2-D geometry of orthorectification to a DTM. In this example, rays 502, 504 from the left- and right-looking P-band radar image are shown. The left-looking and right-looking P-band radar images are each orthorectified to the same or co-incident DTM, resulting in two images of the same scene. The same or co-incident DTM results in the DTMs overlapping the same scene as the P-band radar images.

If the DTM has the correct elevation (such as DTM surface 508), the rays 502, 504 from the left- and right-looking P-band radar image will intersect the correct DTM surface 508 at the correct location 510 in both the orthorectified images. However, if the DTM has the incorrect elevation (such as DTM surface 506), the rays 502, 504 from the left- and right-looking P-band radar image will intersect the incorrect DTM surface 506 at incorrect locations 512A, 514A in both the orthorectified images. The example shown in FIG. 5 represents a scenario where the incorrect DTM surface 506 has a higher elevation than the correct DTM surface 508. As a result of the incorrect elevation of incorrect DTM surface 506, there exists displacement 518 between the geolocations 512A, 512B of pixels 512A, 512B in the orthorectified images. In other words, a DTM with height errors leads to matching pixels in the right- and left-looking images being mapped to different locations. That is, a DTM with height errors leads to a non-coincident placement of pixels. In the right-looking image (based on ray 502), point 512B is located too close to the right-looking image source (such as radar 522). In the left-looking image (based on ray 504), point 514B is located too close to the left-looking image source (such as radar 524).

Figure 6:
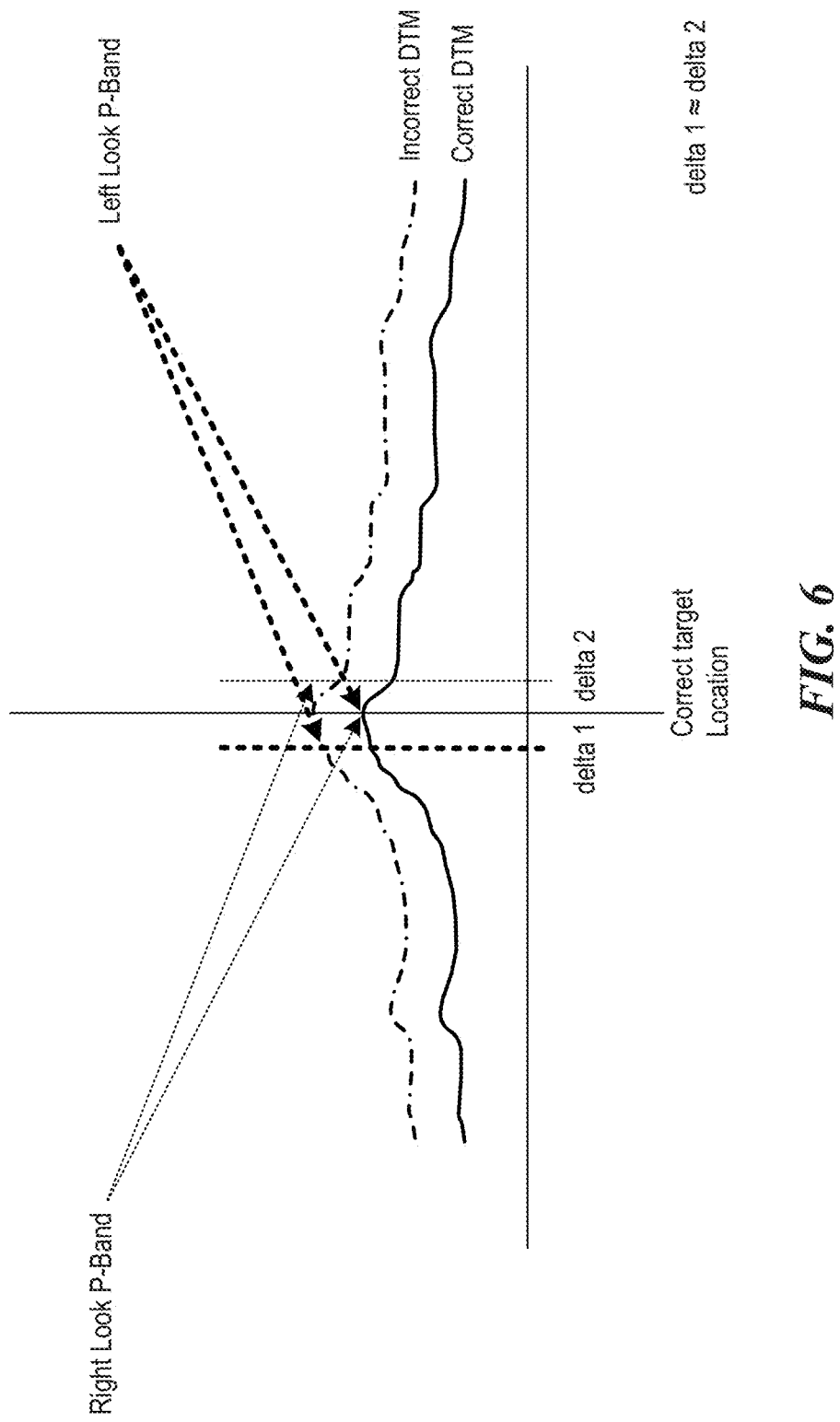
FIG. 6 shows an example of target displacement when an incorrect DTM is used.

FIG. 6 shows an example of target displacement when an incorrect DTM is used. For example, FIG. 6 illustrates how a target is horizontally displaced when an incorrect DTM is used during orthorectification. Delta 2 and delta 1 denote displacements (from the correct target location) associated with left-looking P-band and right-looking P-band respectively, in the event that an incorrect DTM surface is used in orthorectification. Typically, the values of delta 1 and delta 2 are nearly identical.

Figure 7:
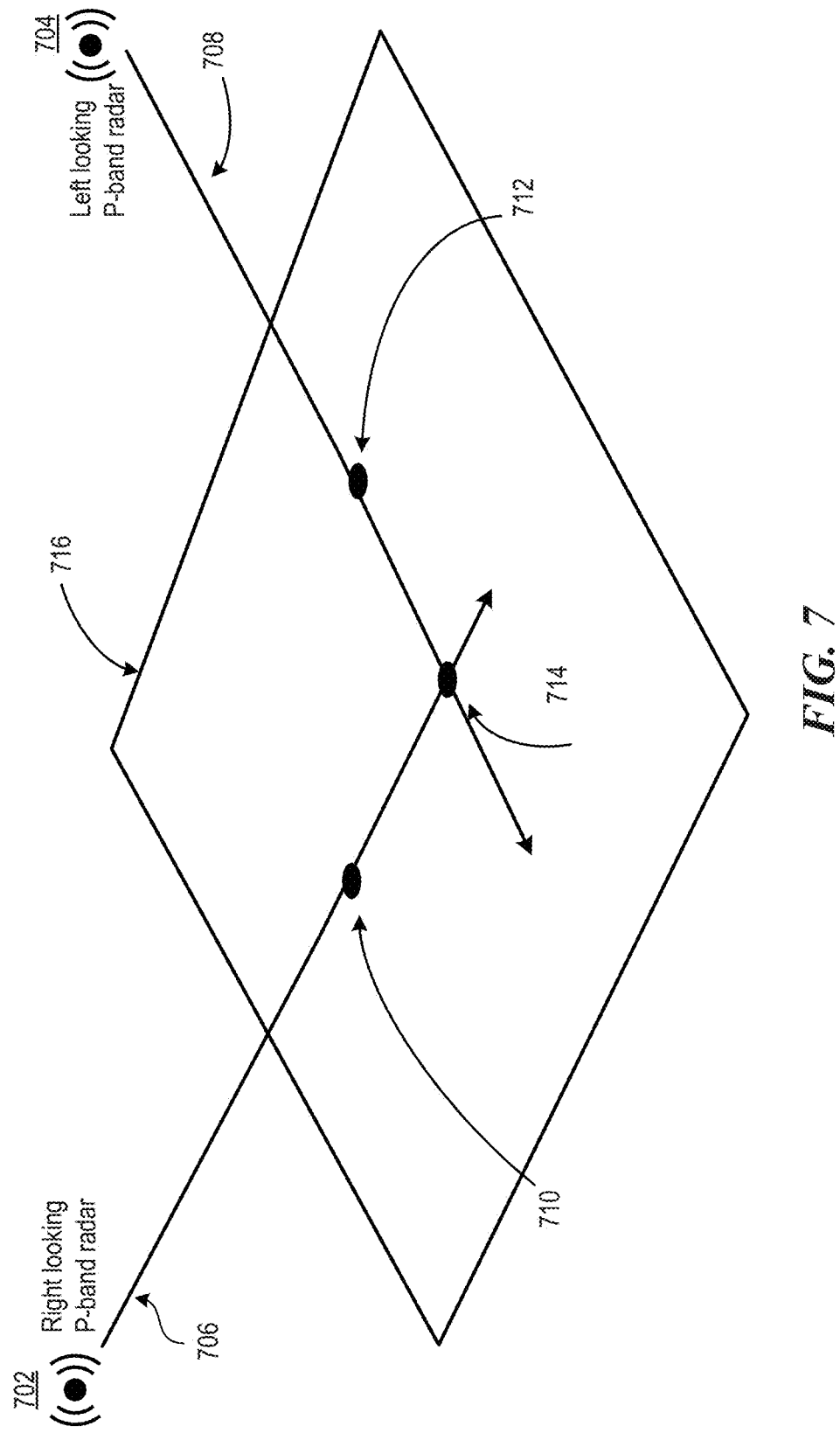
FIG. 7 shows an example of a simplified geometry of possible 3D locations for a uniquely identifiable point common to P-band radar images.

FIG. 7 shows an example of a simplified geometry of possible 3D locations for a uniquely identifiable point common to P-band radar images. FIG. 7 shows an original DTM (e.g., an incorrect DTM) surface 716. The original DTM surface 716 can be at a height different from the height or elevation of the true (actual) DTM surface. For example, an original DTM surface can be at a lower height or a greater height than the true DTM surface. The left-looking P-band radar image from left-looking P-band radar 704 and the right-looking P-band radar image from right-looking P-band radar 702 have at least one ground point that is uniquely identifiable in both P-band radar images and commonly included in both P-band radar images. As a result of applying orthorectification to the left-looking P-band radar image from left-looking P-band radar 704, a locus of possible locations 708 for the at least one uniquely identifiable common to P-band radar images is generated. As a result of applying orthorectification to the right-looking P-band radar image from right-looking P-band radar 706, a locus (e.g., curve) of possible locations 706 for the at least one uniquely identifiable common to P-band radar images is generated. The loci 706 and 708 can be shaped as an ellipsoid in 3D space. The loci 706 and 708 can be approximated to straight lines, but the loci 706 and 708 are not perfectly straight due to atmospheric diffraction and other effects. In theory, the loci 706 and 708 should intersect, because they are pointing at the same spot on the Earth, in their respective images. In practice, due to measurement and various other sorts of small errors, the computed loci may not intersect.

Locus 706 intersects the original DTM surface 716 at point 710. Locus 708 intersects the original DTM surface 716 at point 712. Due to the opposing angles of the loci 706 and 708, their point of closest approach is well defined. The centroid of the line segment resulting from minimization of the distance between the loci 706 and 708 is defined as the point of closest approach (denoted as the single point 714 in FIG. 7 and shown as positioned at the center of a circle lying beneath the original DTM surface 716). According to disclosed embodiments, the elevation of the true DTM surface is computed at the point of closest approach. The point of closest approach (expressed in terms of 3D coordinates) corresponds to the uniquely-identifiable ground point commonly included in at least two P-band radar images. The point of closest approach gives an estimate of the true map location and elevation of the uniquely identifiable ground point commonly included in at least two P-band radar images. The DTM error (also termed as "sub-canopy discrepancy") at the true map location of the common uniquely identifiable ground point is given by:

$$\Delta E = \text{elevation of point of closest approach} - \text{elevation of DTM at the estimated true map location}.$$

The difference in elevation of the DSM and DTM at the estimated true map location can be regarded as the canopy height. In some embodiments, the canopy height can be iteratively refined until a convergence condition is satisfied. In FIG. 7, the shape of the original DTM surface 716 is shown as a plane. This is merely for illustrative purposes. In alternate representations, the original DTM surface 716 can have other three-dimensional shapes, such as an ellipsoid.

Figure 8:
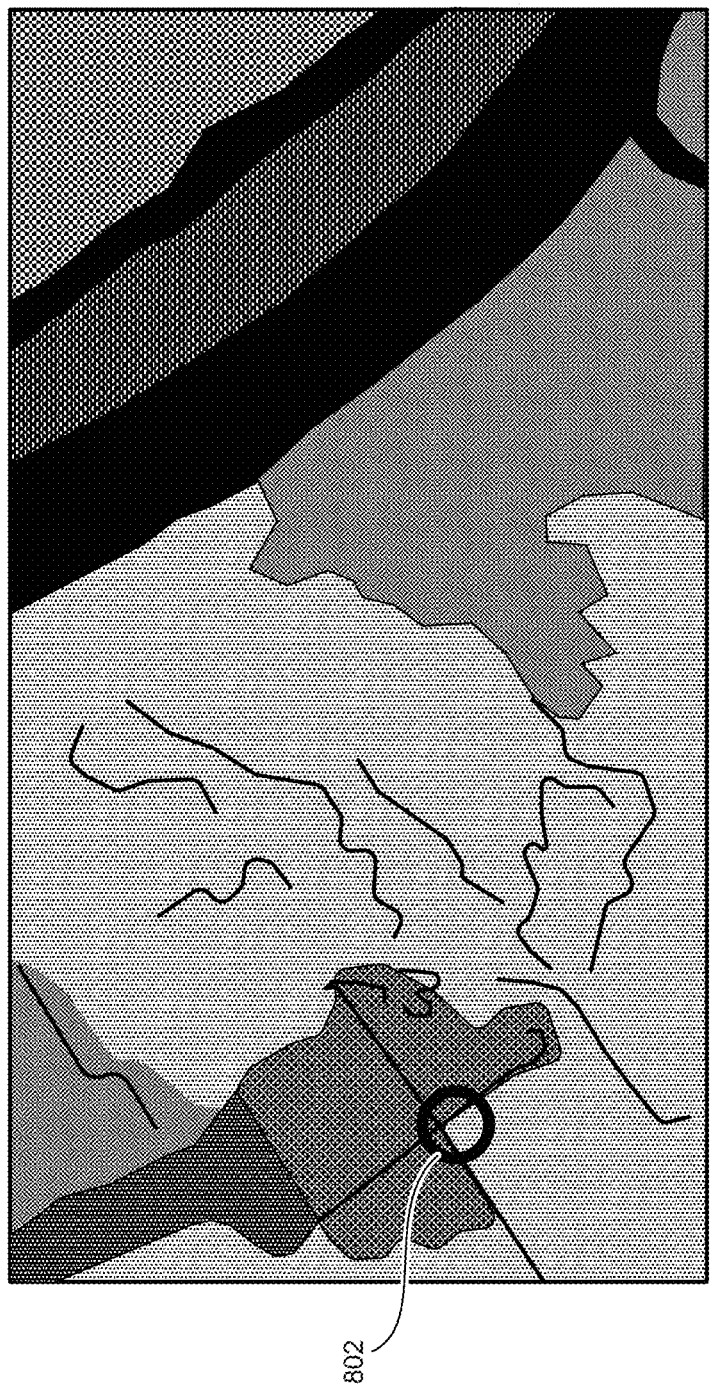
FIG. 8 shows an example of an original DTM using a south-look P-band radar image.

FIG. 8 shows an example of an original DTM using a south-look P-band radar image. In FIG. 8, the position of the trail intersection is toward the top of circle 802. This implies that the uniquely identifiable point common to P-band radar images is located too close to the radar. If the uniquely identifiable point is too close to the radar, the DTM is too high and the canopy height was underestimated (e.g., as illustrated in FIG. 5). In a hypothetical scenario, if the position of the trail intersection was lying outside the circle, this can indicate that the DTM error is significantly more. In this case, it could possibly be an indicator of an issue with the original X-band DSM generation such as an incorrect phase unwrapping.

Figure 9:
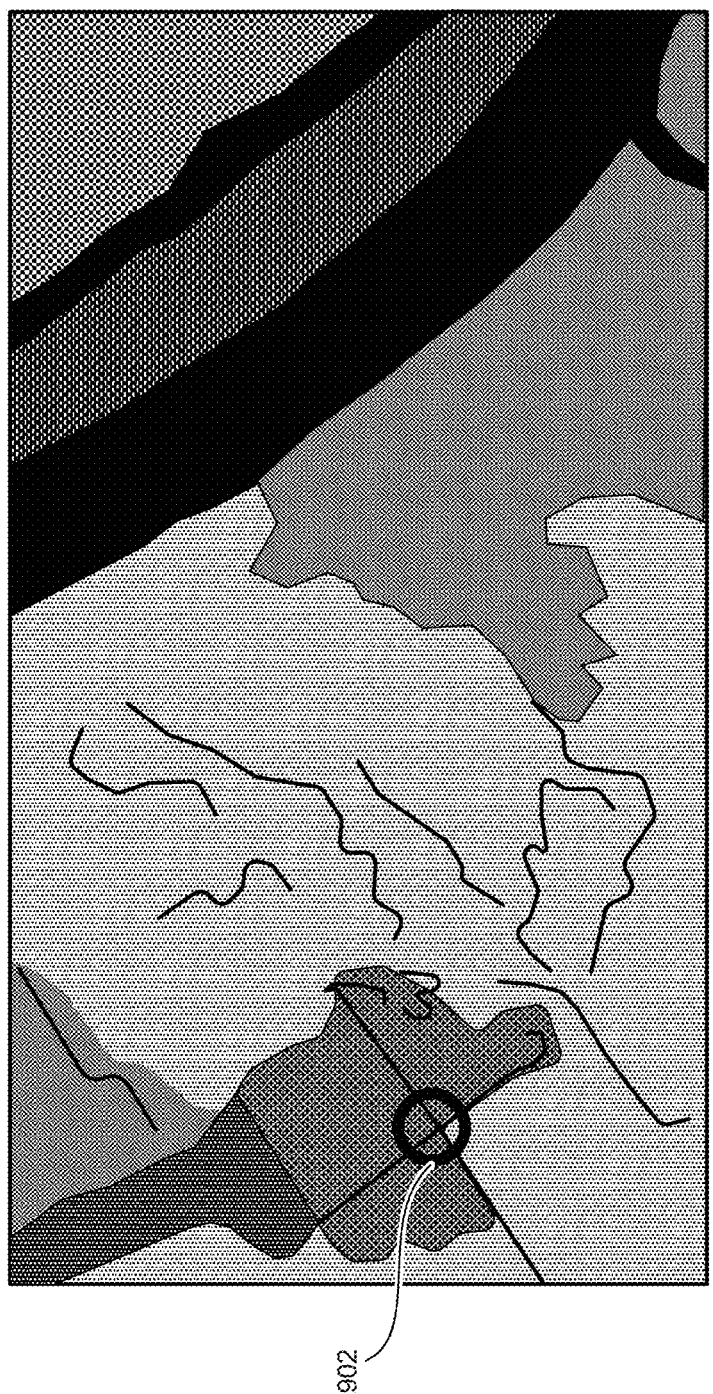
FIG. 9 shows an example of an original DTM using a north-look P-band radar image.

FIG. 9 shows an example of an original DTM using a north-look P-band radar image. North-look can be regarded as equivalent to left-look, and south-look can be equivalent to right-look. Accordingly, FIGS. 8 and 9 depict left- and right-look P-band radar images orthorectified to the original DTM (i.e., prior to applying the correction). For purposes of this disclosure, the original DTM can be regarded as the incorrect DTM. In FIG. 9, the position of the trail intersection is toward the bottom of circle 902. This implies that the uniquely identifiable point common to P-band radar images is located too close to the radar. If the uniquely identifiable point is too close to the radar, this indicates that the DTM is too high. In a hypothetical scenario, if the point position was too far from the sensor location, it would imply that the DTM was too low and the point would be on the north-side of the circle.

Figure 10:
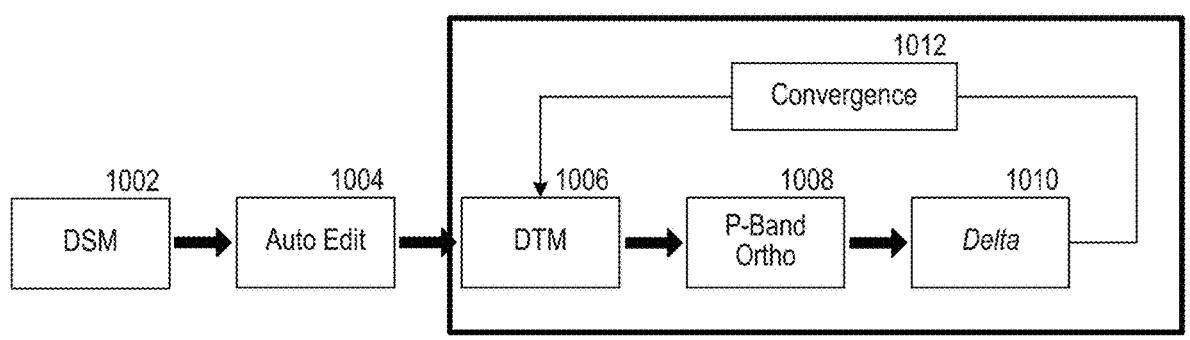
FIG. 10 shows a block diagram illustrating iterative correction applied to a DTM.

FIG. 10 shows a block diagram illustrating conceptual steps for iteratively correcting an estimate of an elevation of a digital elevation model (DEM) of the bare earth under forest canopy. At block 1002, a DEM is received. For example, the DEM can be a DSM generated using X-band IFSAR. At step 1004, the DEM is auto-edited to generate a DTM. The DTM in block 1006 can be regarded as a first generation DTM (or, more generally, an original DTM) that is iteratively refined to a modified DTM at each iteration. Implementation of block 1008 results in at least two P-band radar images (e.g., a left-looking image and a right-looking image) getting orthorectified to the DTM in step 1006. The orthorectification results in correct placement of pixels included in the at least two P-band radar images with respect to map coordinates included in the DEM.

Subsequent to orthorectification, steps associated with determining a 3D coordinate representation (e.g., in terms of cartesian X, Y, Z coordinates) of a point of closest approach is implemented. The point of closest approach is a computationally generated point that corresponds to at least one uniquely identifiable ground point commonly included in the at least two P-band radar images. At step 1010, a delta (e.g., representing an estimated error based on a difference between an elevation value of the uniquely identifiable ground point and a Z coordinate of the point of closest approach) is calculated. Each iteration causes steps associated with blocks 1006, 1008, 1010, and 1012 to get executed. Delta is used to adjust/modify the DTM and re-orthorectify the P-band radar images until the delta converges. For example, computational steps associated with the blocks 1006, 1008, 1010, and 1012 are performed iteratively until the delta satisfies a convergence threshold parameter associated with a convergence condition (in block 1012). For example, if the positional difference between the left- and right-looking P-band images was reduced to less than 1 m, this would be indicative of approximately less than 1 m DTM error (at one point). The convergence threshold can be set according to desired accuracy specifications of the geospatial application. In theory, only one iteration may be required, but other errors in the DEM production can contribute to inaccuracies in the result. As such, the desired accuracy can be achieved after multiple iterations.

In some embodiments, convergence is achieved based on a near-exact alignment of a first uniquely identifiable ground point included in a first P-band radar image and a second uniquely identifiable ground point included in a second P-band radar image. In some embodiments, convergence is achieved based on an exact alignment of the first uniquely identifiable ground point and the second uniquely identifiable ground point.

Figure 11:
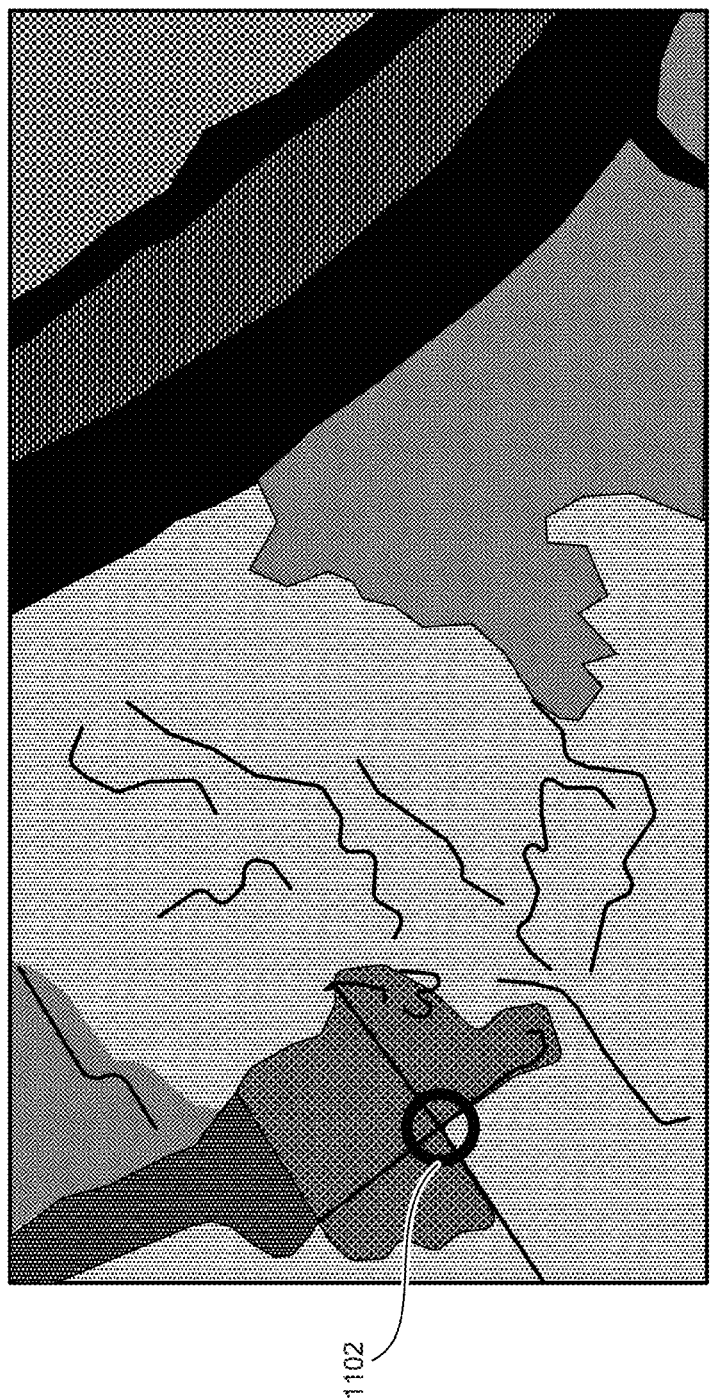
FIG. 11 shows an example of a modified DTM using a south-look P-band radar image.

FIG. 11 shows an example of a modified DTM using a south-look P-band radar image. In FIG. 11, the position of the trail intersection coincides with the center of circle 1102. This indicates that the canopy height is correct and the modified DTM represents the true bare ground elevation.

Figure 12:
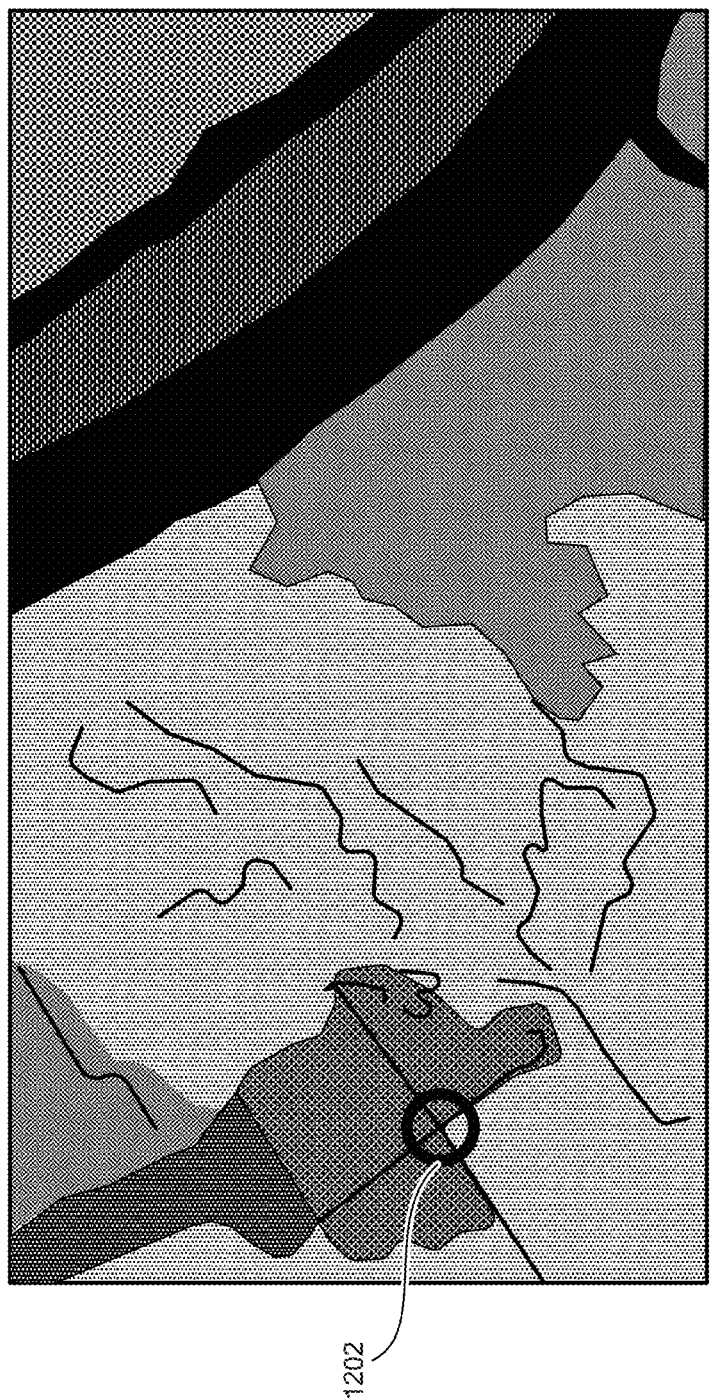
FIG. 12 shows an example of a modified DTM using a north-look P-band radar image.

FIG. 12 shows an example of a modified DTM using a north-look P-band radar image. Essentially, FIGS. 11 and 12 depict left- and right-look P-band radar images orthorectified to the corrected DTM (i.e., the modified DTM). In FIG. 12, the position of the trail intersection coincides with the center of circle 1202. This indicates that the canopy height is correct and the modified DTM represents the true bare ground elevation.

Figure 13:
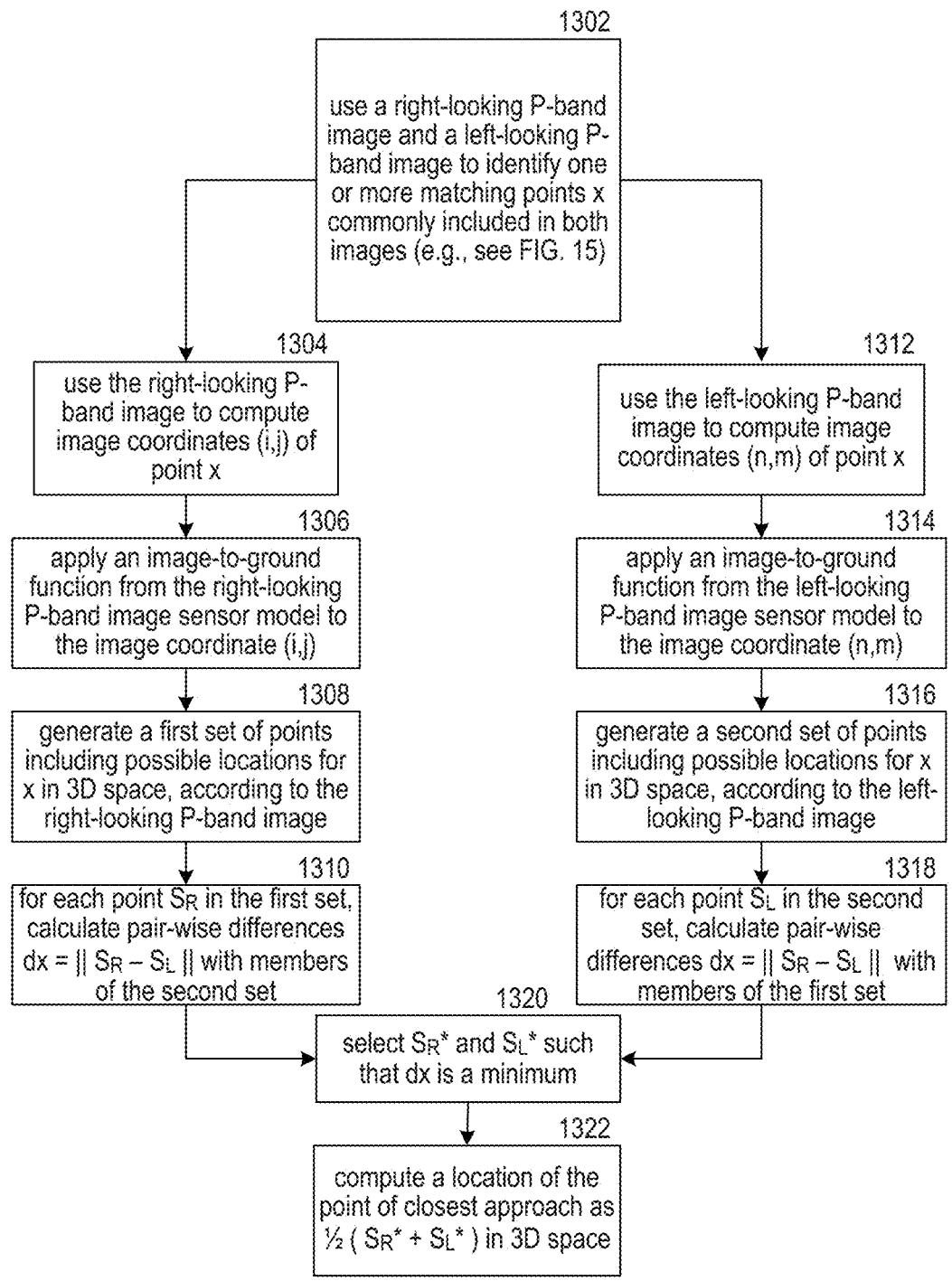
FIG. 13 is an example flowchart of a method for identifying a point of closest approach.

FIG. 13 is an example flowchart of a method for identifying the point of closest approach. The point of closest approach corresponds to the location of a uniquely identifiable ground point included in at least two P-band images such that the point is positioned identically in 3D space in the two images. The location of the point of closest approach is computationally generated based on the measured pair-wise differences in the positions of the points in each image when projected to a DTM surface that, because of errors in computing the original DTM, often lies above or below the surface of the true ground surface. Embodiments of the present disclosure are directed at correcting or adjusting the original DTM to generate a modified DTM which corresponds to the true ground surface. As a result, after DTM adjustment to the point of closest approach, the position of the uniquely identifiable ground point commonly included in at least two P-band images matches exactly (or, with near exactness). According to embodiments disclosed herein, adjusting or correcting the original DTM is equivalent to changing an elevation value (height) of the original DTM.

Starting at step 1302, the method includes using the right-looking P-band radar image and the left-looking P-band radar image to identify one or more matching points (denoted x) commonly included in the right-looking P-band radar image and the left-looking P-band radar image. Details of identifying matching points from two P-band radar images are discussed in connection with FIG. 15. In this flowchart, steps 1304, 1306, 1308, and 1310 are performed using the right-looking P-band radar image. Steps 1312, 1314, 1316, and 1318 are performed using the left-looking P-band radar image. For purposes of brevity, only steps 1304, 1306, 1308, and 1310 are discussed herein in greater detail. It will occur to one of ordinary skill that similar steps for processing the left-looking P-band radar image can be implemented. At step 1304, the method includes using the right-looking P-band radar image to compute image coordinates (represented as pixels (i, j)) of the common matching points. At step 1306, the method includes applying an image-to-ground function from the right-looking P-band image sensor model to the image coordinate (i,j). For example, a sensor model can be defined using calibrated signal delay parameters based on the inertial measurement unit (INS) data and GPS coordinates of the aerial platform at the time of pixel collection, the image's look vector, the central wavelength of the radar, antenna positions relative to the INS data and GPS coordinates of the aerial platform, and other parameters. Disclosed embodiments are not tied to specific sensor models. A suitable sensor model can be used for implementing the disclosed embodiments. At step 1308, the method includes generating (according to the right-looking P-band radar image) a first set of points including possible locations for common matching points in 3D space. Step 1306 can be regarded as the bridge between step 1304 and step 1308. In order to generate the first set of points in step 1308, the sensor geometry model is applied for computing the locus on which the first set of points are included. The sensor geometry model fixes the position of the sensor, such that a mathematical relationship (involving pixels (i,j) for the right-look P-band image) can be determined.

At step 1310, the method includes calculating pair-wise differences $dx=\|S_R-S_L\|$ with members of the second set, where $\|a\|$ denotes the mathematical norm function which is representative of Euclidean distance. Similarly, at step 1318, the method includes calculating pair-wise differences $dx=\|S_R-S_L\|$ with members of the first set. At step 1320, the method includes selecting a pair $S_{R*}$ and $S_{L*}$ such that dx is a minimum over all the pair-wise differences computed in steps 1310 and 1318. At step 1322, the method includes computing a location of the point of closest approach based on a mathematical function of $S_{R*}$ and $S_{L*}$. For example, in some embodiments, the point of closest approach is calculated as $\frac{1}{2}(S_{R*}+S_{L*})$ in 3D space. The point of closest approach corresponds to the uniquely identifiable ground point commonly included in at least two P-band radar images and represents an estimate of the true position of the uniquely identifiable ground point in 3D space. In some embodiments, the point of closest approach is expressed in terms of a latitude, a longitude, and a height (elevation).

Figure 14:
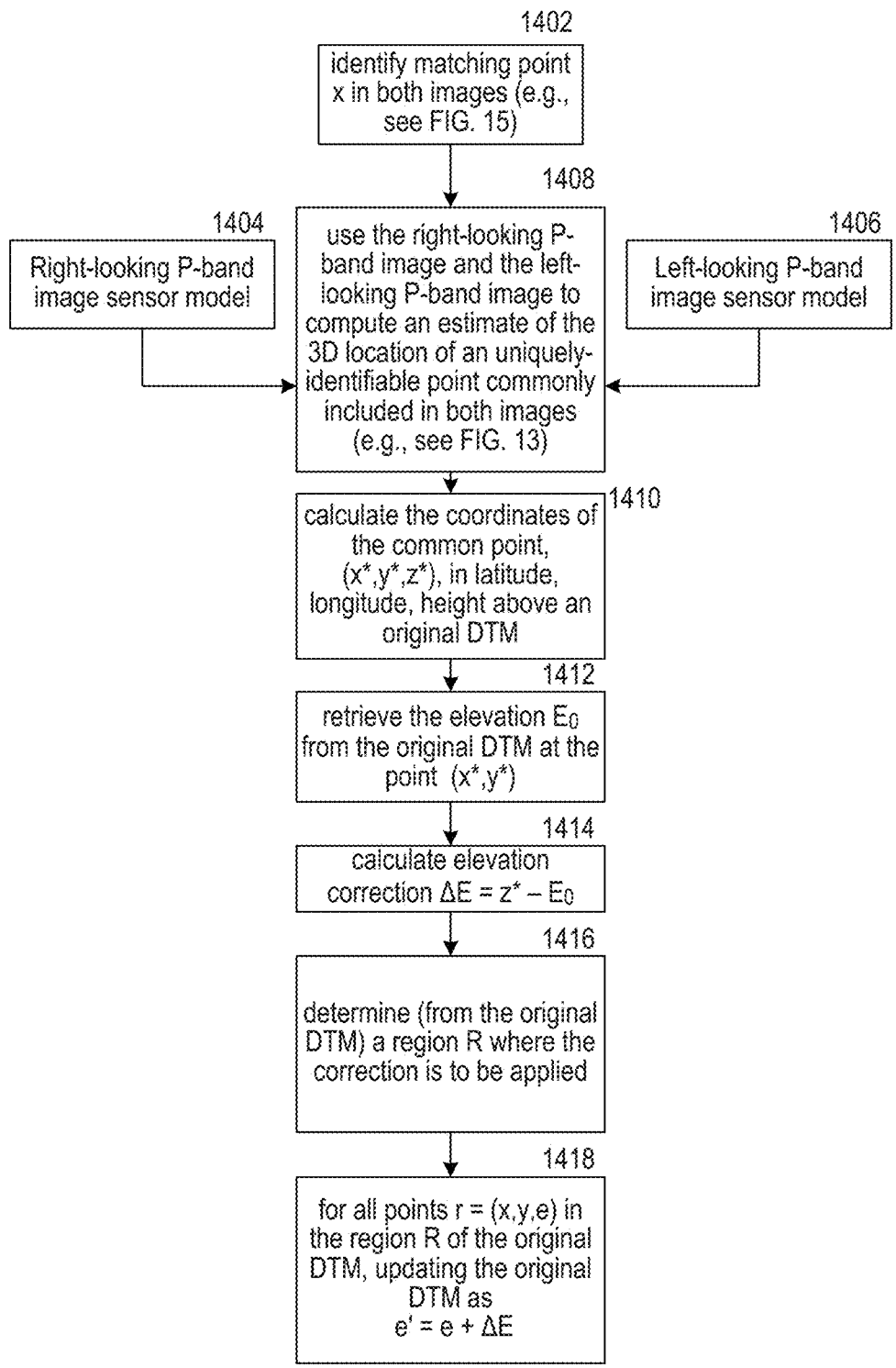
FIG. 14 is an example flowchart of a method for updating an original DTM.

FIG. 14 is an example flowchart of a process (e.g., a computational method) for updating an original DTM. At step 1402, the process includes identifying (e.g., using a method discussed in connection with FIG. 15) one or more matching pairs of ground points commonly included in a right-looking P-band radar image and a left-looking P-band radar image. At step 1408, the process includes computing (e.g., using a method discussed in connection with FIG. 13) an estimate of the 3D location of a uniquely identifiable point commonly included in both images. The uniquely identifiable point is located at ground level in both images. The computation at step 1408 can include the use of sensor models, such as a right-looking P-band image sensor model 1404 and a left-looking P-band image sensor model 1406. Sensor models may be defined as a physical model or a statistical model. A physical sensor model can be based on the physical principles of image formation. A statistical sensor model can be expressed as a generic mathematical function (such as a rational function) with parameter sets so that the correct ground-to-image function is defined. Image metadata such as the GPS coordinates of the aerial platform (on which the radar systems collecting the image data is mounted) at the time of pixel collection, the image's look vector, the central wavelength of the radar, and other parameters can be used for defining a sensor model. At step 1410, the process calculates the coordinates of the common point (a/k/a the uniquely identifiable point located at ground level in both the P-band radar images). The coordinates of the common point can be expressed in terms of a latitude, a longitude, and a height, above an original DTM surface. For example, in step 1410, the inverted (image-to-ground) sensor model function for the left-looking image is applied multiple times to the common point in the left-looking P-band radar image, using a range of possible ground elevations. Accordingly, the process determines the locus of points on the ground that could have given rise to the common point in the left looking P-band radar image. This results in a curve in 3D space, including possible 3D locations for the common point, as defined by the left-looking P-band radar image. The same step is repeated for the right-looking P-band radar image, giving rise to two different loci (curves) in 3D space. At step 1412, the process retrieves from the original DTM the elevation (denoted $E_0$ and expressed in terms of a latitude and a longitude) at the common point. At step 1414, the process calculates an elevation correction (e.g., an error estimate representing sub-canopy discrepancy) based on a difference between the elevation at the common point and the Z-coordinate of the common point. At step 1416, the process determines (from the original DTM), a region where the elevation correction can be applied. The region can be expressed in the form of a polygon boundary or a mask. At step 1418, a modified DTM is generated based on adding the elevation correction to elevation values (denoted e) of points located inside the region.

Figure 15:
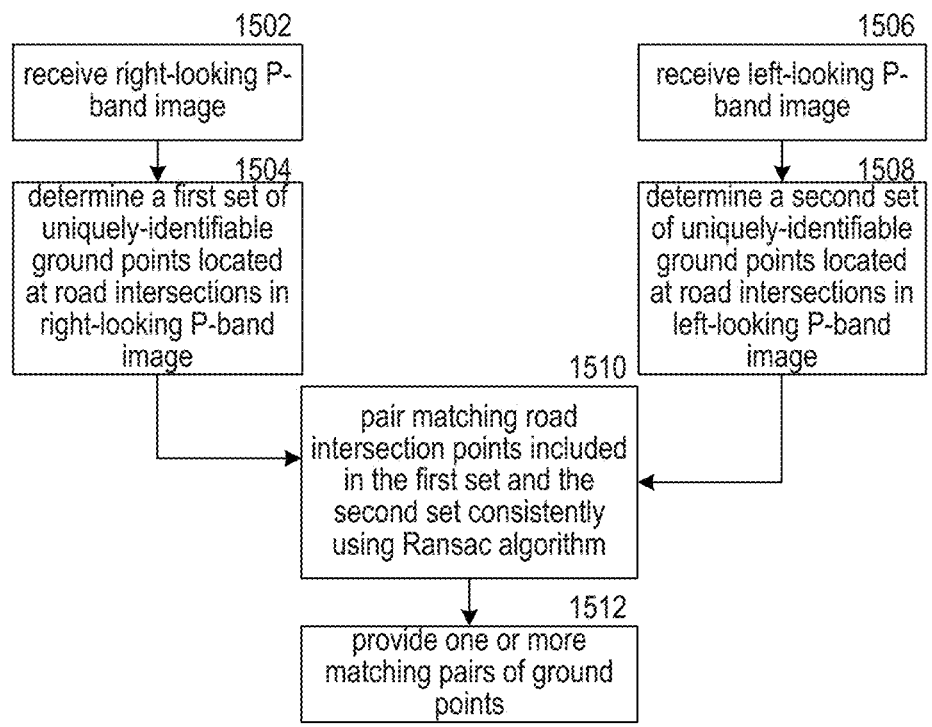
FIG. 15 is an example flowchart of a method for identifying the ground location of at least one uniquely identifiable point common to P-band radar images.

FIG. 15 is an example flowchart of a process (e.g., a computer-implemented method) for identifying the ground location of at least one uniquely identifiable point common to P-band radar images. Steps 1502 and 1504 correspond to processing of right-looking P-band radar image. Steps 1506 and 1508 correspond to processing of left-looking P-band radar image. For purposes of brevity, only details of steps 1502 and 1504 are discussed in greater detail. It will occur to one of ordinary skill that similar steps for processing the left-looking P-band radar image can be implemented. At step 1502, the process receives a right-looking P-band radar image. At step 1504, the process determines (e.g., computationally using linear feature detection techniques) a first set of uniquely identifiable ground points located at road intersections of the right-looking P-band radar image. At step 1508, the process determines a second set of uniquely identifiable ground points located at road intersections of the left-looking P-band radar image. At step 1510, the process pairs matching road intersection points included in the first set and the second set consistently, for example, using the Random Sample Consensus (RANSAC) algorithm. Detected points from each image are labeled as "matching" if the points are expected to be on the same point on the ground (e.g., a point A in the left-looking image corresponds to point A in the right-looking image). As there can be observation errors in data sets, it is conceivable that there can be outliers in the matching process (e.g., the derived canopy height can have multiple values due to signal distortion/interference or the "matched" point may not represent exactly the same ground feature). The Random Sample Consensus (RANSAC) algorithm is a method of outlier detection such that that results are consistent within a certain probability level. The greater the number of points and iterations used in the RANSAC algorithm, the higher the probability that the results are valid.

At step 1512, the process provides one or more matching pairs of ground points that are uniquely identifiable and commonly included in two P-band radar images.

Figure 16:
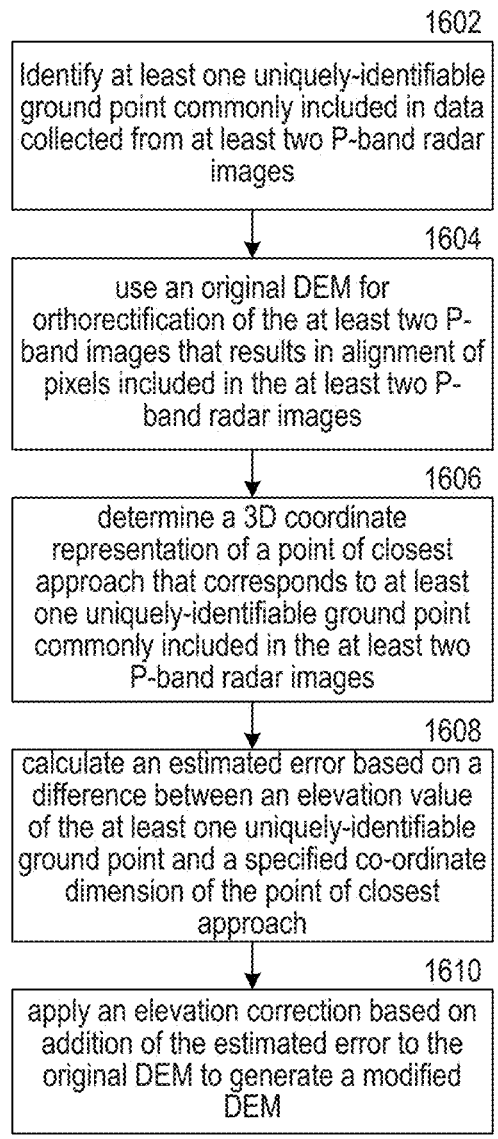
FIG. 16 is an example flowchart of a method for automatically generating a modified DEM based on applying a correction to an original DEM.

FIG. 16 is an example flowchart of a process (e.g., a computer-implemented method) for automatically generating a modified DEM based on applying a correction to an original DEM. At step 1602, the process identifies a location of at least one uniquely identifiable ground point commonly included in data collected from at least two P-band radar images (such as a first P-band radar image and a second P-band radar image). The uniquely identifiable ground point can be derived from intersections of roads included in the data collected from at least two P-band radar images. At step 1604, the process uses an original DEM for orthorectification of the at least two P-band radar images that results in alignment (e.g., correct placement with respect to map coordinates included in the original DEM) of pixels included in the at least two P-band radar images. If the uniquely identifiable ground point in the first P-band radar image is in alignment with the uniquely identifiable ground point in the second P-band radar image, then no elevation correction may be necessary. However, if the uniquely identifiable ground point in the first P-band radar image is not in alignment with the uniquely identifiable ground point in the second P-band radar image, then the process moves to step 1606. At step 1606, the process determines a point of closest approach that corresponds to at least one uniquely identifiable ground point commonly included in the at least two P-band radar images. The point of closest approach can be expressed in terms of 3D coordinates. The point of closest approach provides an estimate of the true map (i.e., geographical map) location and elevation of the common uniquely identifiable ground point.

Determining the point of closest approach and/or the orthorectification can include using a left-looking sensor model applicable on the left-looking P-band radar image and a right-looking sensor model applicable on the right-looking P-band radar image. A (left-looking or right-looking) sensor model for a remotely sensed image is a function that takes as input a location on the earth and returns the pixel in the image to which the location is mapped. This function may also be inverted to return a location on the earth given the corresponding image pixel. In that case, an elevation for the location on the earth can be a known quantity. At step 1608, the process calculates an estimated error based on a difference between an elevation value of the at least one uniquely identifiable ground point and a specified coordinate of the point of closest approach. The specified coordinate can be the Z-coordinate in the 3D coordinate representation of the point of closest approach. The elevation value of the at least one uniquely identifiable ground point can be derived from the original DEM. The DEM error at the true map location of the common uniquely identifiable ground point is given by:

$\Delta E$=elevation of point of closest approach−elevation of DEM at the estimated true map location.

In an ideal scenario, $\Delta E$=0, indicating that the point of closest approach and the estimated true map location are identical. However, because of measurement/instrumentation error in practice, $\Delta E$ may be very small and close to zero. The closer $\Delta E$ is to zero, the greater the convergence. The degree of convergence can be based on a convergence threshold parameter. When the estimated error satisfies the convergence threshold parameter, the elevation of the DEM at the estimated true map location is regarded as the true ground elevation. Subsequently, subtracting the ground elevation from the original DSM provides the true canopy height. At step 1610, the process applies the elevation correction based on addition of the estimated error to the original DEM to generate a modified DEM. Applying the elevation correction (equivalent to adding the estimated error to the original DEM) results in exact or near-exact alignment of a first uniquely identifiable ground point included in a first P-band radar image and a second uniquely identifiable ground point included in a second P-band radar image. For example, applying the elevation correction to the original DTM results in an exact positioning or near exact-positioning of the point of closest approach in the at least two P-band radar images orthorectified to a surface defined by the modified DTM. In some embodiments, the near-exact alignment is based on a condition that the estimated error iteratively satisfies a convergence threshold parameter.

Determining the point of closest approach (step 1606) can further include the steps of: (1) identifying a first locus (curve) of a first uniquely identifiable ground point included in the first P-band radar image; (2) identifying a second locus (curve) of a second uniquely identifiable ground point included in the second P-band radar image; (3) determining data defining a true ground surface based on an intersection of the first locus and the second locus with the original DEM; and (4) computationally determining the point of closest approach based on the data defining the true ground surface such that the point of closest approach is located exactly or near-exactly on the true ground surface. In some embodiments, determining that the point of closest approach is located near-exactly on the true ground surface is based on verifying that the estimated error iteratively satisfies a convergence threshold parameter.

FIGS. 17A-17D show examples of P-band radar images. For example, FIG. 17A can be a first P-band radar image and FIG. 17B can be regarded as a second P-band radar image, orthorectified to the original DTM (e.g., the incorrect DTM). The lower two images (i.e., FIGS. 17C and 17D) can be regarded as the first P-band radar image and the second P-band radar image that are orthorectified to the modified DTM (e.g., generated using the methods disclosed herein). FIGS. 17A and 17C are right-looking P-band radar images. FIGS. 17B and 17D are left-looking P-band radar images.

Figure 18A:
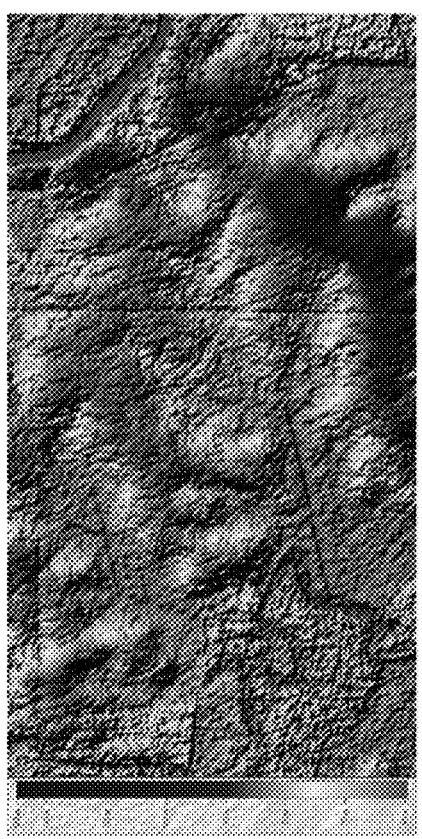
FIGS. 18A-18D illustrate geospatial footprints corresponding to the geographical area depicted in the P-band radar images shown in FIGS. 17A-17D.
Figure 18B:
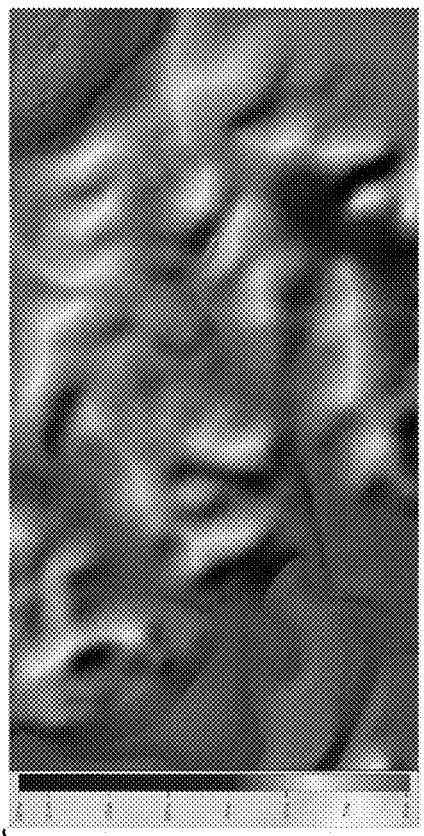
Figure 18C:
Figure 18D:
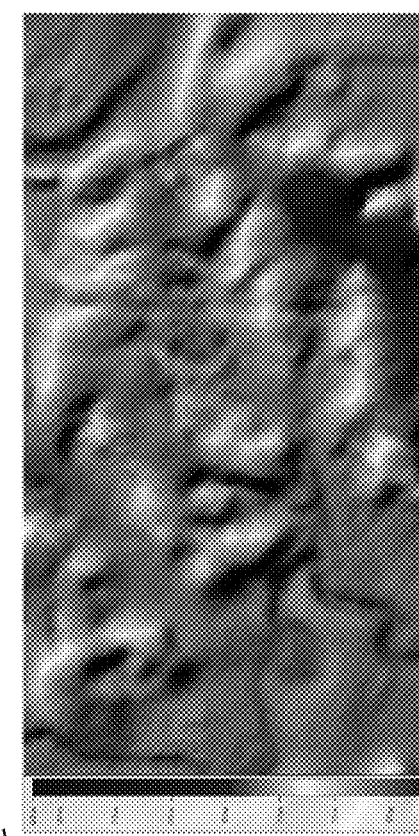

FIGS. 18A-18D illustrate geospatial footprints corresponding to the geographical area depicted in FIGS. 17A-17D. For example, FIG. 18A shows an example of an original (incorrect) DTM. FIG. 18B shows an example of a DSM associated with the original DTM, FIG. 18C is an example of a modified DTM, and FIG. 18D is an example of a X-band radar image. FIGS. 18A-18D depict the characteristics of the terrain shown in FIGS. 17A-17D, indicating that the terrain is almost fully forested (e.g., as illustrated by the rough textured appearance in the DSM shown in FIG. 18B).

FIGS. 19A-19D illustrate a zoomed view of the P-band radar images in FIGS. 17A-17D. For example, the images in FIGS. 19A-19D are captured at a position of approximately 67% of the distance from the north and approximately 40% of the distance from the west. The original DTM is approximately 3 m too low in the region corresponding to the zoomed view. FIGS. 19A and 19B demonstrate that the road vector (e.g., shown using bolded T-lines) does not pass through the middle (e.g., shown using a thick circle) of the road when the left- and right-looking images are orthorectified to the original DTM. The center of the T-lines is not in line with the center of the circle. However, FIGS. 19C and 19D demonstrate that the road vector clearly passes through the middle of the road when the left and right looking images are orthorectified to the modified DTM. The center of the T-lines is coincident with the center of the circle. Ground positions are shifted between FIGS. 19A and 19B when the left- and right-looking images are orthorectified to the original DTM. However, when the left- and right-looking images are orthorectified to the modified DTM, (as shown in FIGS. 19C and 19D), the ground positions are properly aligned between the left- and right-looking images.

ALTERNATIVE EMBODIMENTS

Alternative Embodiment 1

In some embodiments, instead of applying a constant correction $\Delta E$ to a region of the DEM to be corrected, a correction surface may be applied, in which the amount of correction $\Delta E$ varies spatially. For example, a correction may be obtained by defining multiple identifiable common image points $x_i$ in the left-looking and right-looking P-band radar images, and calculating $\Delta E_i$ for each of them. A correction surface can be defined for a portion (or, the entirety) of the DTM surface by applying the correction in areas around these points, or by interpolating the values of $\Delta E_i$ to define a "correction surface" to be applied to the DTM surface. The result will be a set of ordered pairs of points and adjustments, expressed as $(x_i, \Delta E_i)$, for i=1 to n, where n denotes the number of identifiable image points commonly included in the left-looking and right-looking P-band radar images.

Once these ordered pairs are obtained, a correction surface $\Delta E(x, y)$ can be defined for $(x, y)$ over part or all of the coverage area of the DTM. This can be done by applying constant corrections $\Delta E_i$ in predefined polygonal regions around the points $x_i$, or by interpolating the values of $\Delta E_i$ using a standard interpolation method such as kriging, bilinear interpolation, or other methods.

The correction surface can then be applied to the DTM as follows:

New DTM$(x,y)$=Original DTM$(x,y)$+$\Delta E(x,y)$

Alternative Embodiment 2

In some embodiments, instead of using P-band radar images taken with side-look angles, a correction can be applied using P-band radar images taken with look angles that are not directly side-looking. For example, forward-looking P-band radar images can be used in some implementations.

Alternative Embodiment 3

In some embodiments, instead of using opposite-facing P-band radar images, a correction can be applied using non-opposite-facing P-band radar images. For example, a correction can be applied using two P-band radar images that have a sufficient convergence geometry but are not directly opposite each other.

Alternative Embodiment 4

The P-band radar images used to derive the correction can be collected using different platforms at the same or different times, rather than using a single platform twice over a brief interval, e.g., as described in FIG. 1.

Alternative Embodiment 5

The radar collecting the images can be of a suitable wavelength that penetrates foliage to backscatter from features on or near the ground. For example, in some cases, images based on L-band wavelengths or other canopy penetrating signal wavelengths can be used instead of P-band.

Alternative Embodiment 6

In some embodiments, the DEM to be corrected can be a DSM. For example, the DSM can be the co-incident DSM created by X-band IFSAR of an aerial platform. In these embodiments, the initial P-band images can be orthorectified to the DSM first and then the disclosed methods can be used to determine an initial estimate of the canopy height. Thus, these embodiments are directed at creating an original DTM from the DSM as opposed to correcting an initial DTM.

In this disclosure, a technique to estimate the DTM (sub-canopy) terrain surface is disclosed. Previous methods have typically relied on guesses of the canopy height. X-band does not penetrate the trees and see the ground, whereas P-band radar offers the unique characteristic of being able to see the ground through the trees. Because X-band does not penetrate the trees and see the ground, DTM generation from X-band IFSAR is based on estimating the ground elevation in areas of forest canopy. On the other hand, interferometry (for direct DTM generation) at P-band wavelengths is difficult (and typically requires repeat-pass collection due to the long baseline requirement). The disclosed technique combines interferometry for X-band and leverages known geometry relationships for two opposite-look co-incident P-band radar images.

Some of the embodiments described herein are described in the general context of methods or processes, which may be implemented in one embodiment by a computer program product, embodied in a computer-readable medium, including computer-executable instructions, such as program code, and executed by computers in networked environments. A computer-readable medium may include removable and non-removable storage devices including, but not limited to, Read-Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention(s) to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention(s) in various embodiments and with various modifications as are suited to the particular use contemplated. The features of the embodiments described herein may be combined in all possible combinations of methods, apparatus, modules, systems, and computer program products.

We claim:

1. A method for automatically generating a correction of an estimate of a digital elevation model (DEM) elevation of the bare earth under forest canopy comprising:
    identifying at least one uniquely-identifiable ground point commonly included in data collected from at least two P-band radar images;
    using an original DEM for orthorectification of the at least two images that results in alignment of pixels included in the at least two P-band radar images;
    determining a 3D coordinate representation of a point of closest approach that corresponds to the at least one uniquely-identifiable ground point commonly included in the at least two P-band radar images;
    calculating an estimated error based on a difference between an elevation value of the at least one uniquely-identifiable ground point and a specified co-ordinate of the point of closest approach; and
    applying an elevation correction based on addition of the estimated error to the original DEM to generate a modified DEM.

2. The method of claim 1, wherein the specified co-ordinate of the point of closest approach corresponds to a Z-coordinate in the 3D coordinate representation of the point of closest approach, and wherein the 3D coordinate representation is expressed in terms of an ordered combination of a latitude, a longitude, and a height.

3. The method of claim 1, wherein adding the estimated error to the original DEM results in exact or near-exact alignment of a first uniquely-identifiable ground point included in a first P-band radar image and a second uniquely-identifiable ground point included in a second P-band radar image.

4. The method of claim 3, wherein the near-exact alignment is based on a condition that the estimated error iteratively satisfies a convergence threshold parameter.

5. The method of claim 1, wherein the at least one uniquely-identifiable ground point commonly included in data collected from at least two P-band radar images is located at a ground level in the data, and wherein the elevation value of the at least one uniquely-identifiable ground point is derived from the original DEM, and wherein the elevation value of the at least one uniquely-identifiable ground point is expressed in terms of a latitude and a longitude.

6. The method of claim 1, wherein the DEM includes a digital source model (DSM) or a digital terrain model (DTM) that is based on X-band interferometric synthetic aperture radar (IFSAR) data, and the data collected from the at least two P-band radar images is based on P-band synthetic aperture radar (SAR).

7. The method of claim 1, wherein the alignment of pixels included in the at least two P-band radar images is with respect to map coordinates included in the original DEM, and wherein the orthorectification utilizes a right-looking P-band image sensor model for a right looking P-band radar image and a left-looking P-band image sensor model for a left looking P-band radar image.

8. The method of claim 1, wherein the at least one uniquely-identifiable ground point commonly included in data collected from at least two P-band radar images is derived from intersections of roads included in the data collected from at least two P-band radar images.

9. The method of claim 1, wherein the at least two P-band radar images include a first P-band radar image and a second P-band radar image, and wherein determining the 3D coordinate representation of the point of closest approach includes:
identifying a first locus of a first uniquely-identifiable ground point included in the first P-band radar image;
identifying a second locus of a second uniquely-identifiable ground point included in the second P-band radar image;
determining data defining a true ground surface based on an intersection of the first locus and the second locus with the original DEM; and
computationally determining the point of closest approach based on the data defining the true ground surface such that the point of closest approach is located exactly or near-exactly on the true ground surface.

10. The method of claim 9, wherein computationally determining that the point of closest approach is located near-exactly on the true ground surface is based on a condition that the estimated error iteratively satisfies a convergence threshold parameter.

11. A non-transitory computer-readable storage medium storing instructions configured to cause at least one computing device to perform a method for automatically generating a correction of an estimate of a digital terrain model (DTM) elevation of the bare earth under forest canopy comprising instructions for:
identifying at least one uniquely-identifiable ground point commonly included in data collected from at least two P-band radar images;
using an original DTM for orthorectification of the at least two images that results in alignment of pixels included in the at least two P-band radar images;
determining a 3D coordinate representation of a point of closest approach that corresponds to the at least one uniquely-identifiable ground point commonly included in the at least two P-band radar images;
calculating an estimated error based on a difference between an elevation value of the at least one uniquely-identifiable ground point and a specified co-ordinate of the point of closest approach; and
applying an elevation correction based on addition of the estimated error to the original DTM to generate a modified DTM.

12. The computer-readable storage medium of claim 11, wherein the at least two P-band radar images include a first P-band radar image and a second P-band radar image, and wherein determining the 3D coordinate representation of the point of closest approach includes:
identifying a first locus of a first uniquely-identifiable ground point included in the first P-band radar image;
identifying a second locus of a second uniquely-identifiable ground point included in the second P-band radar image;
determining data defining a true ground surface based on an intersection of the first locus and the second locus with the original DTM; and
computationally determining the point of closest approach based on the data defining the true ground surface such that the point of closest approach is located exactly or near-exactly on the true ground surface.

13. The computer-readable storage medium of claim 9, wherein computationally determining that the point of closest approach is located near-exactly on the true ground surface is based on a condition that the estimated error iteratively satisfies a convergence threshold parameter.

14. The computer-readable storage medium of claim 11, wherein the DEM includes a digital source model (DSM) or a digital terrain model (DTM) that is based on X-band interferometric synthetic aperture radar (IFSAR) data, and the data collected from the at least two P-band radar images is based on P-band synthetic aperture radar (SAR).

15. The computer-readable storage medium of claim 11, wherein the alignment of pixels included in the at least two P-band radar images is with respect to map coordinates included in the original DEM, and wherein the orthorectification utilizes a right-looking P-band image sensor model for a right looking P-band radar image and a left-looking P-band image sensor model for a left looking P-band radar image.

16. A computer system comprising:
at least one processor and
at least one memory comprising instructions configured to cause the at least one processor to perform a method for automatically generating a correction of an estimate of a digital terrain model (DTM) elevation of the bare earth under forest canopy, the instructions comprising instructions for:
identifying at least one uniquely-identifiable ground point commonly included in data collected from at least two P-band radar images;
using an original DTM for orthorectification of the at least two images that results in alignment of pixels included in the at least two P-band radar images;
determining a 3D coordinate representation of a point of closest approach that corresponds to the at least one uniquely-identifiable ground point commonly included in the at least two P-band radar images;

calculating an estimated error based on a difference between an elevation value of the at least one uniquely-identifiable ground point and a Z-coordinate in the 3D coordinate representation of the point of closest approach; and applying an elevation correction based on addition of the estimated error to the original DTM to generate a modified DTM.

17. The system of claim 16, wherein the point of closest approach provides an estimate of a true map location and an elevation of the at least one uniquely-identifiable ground point.

18. The system of claim 16, wherein adding the estimated error to the original DEM results in exact or near-exact alignment of a first uniquely-identifiable ground point included in a first P-band radar image and a second uniquely-identifiable ground point included in a second P-band radar image.

19. The system of claim 18, wherein the near-exact alignment is based on a condition that the estimated error iteratively satisfies a convergence threshold parameter.

20. The system of claim 16, wherein applying the elevation correction to the original DTM results in an exact positioning or near exact-positioning of the point of closest approach in the at least two P-band radar images orthorectified to a surface defined by the modified DTM.

* * * * *

UNITED STATES PATENT AND TRADEMARK OFFICE
CERTIFICATE OF CORRECTION

PATENT NO. : 11,551,366 B2
APPLICATION NO. : 17/193277
DATED : January 10, 2023
INVENTOR(S) : Stephen Griffiths et al.

It is certified that error appears in the above-identified patent and that said Letters Patent is hereby corrected as shown below:

In the Specification

In Column 10, Line 13, delete "that that" and insert -- that --.

Signed and Sealed this
Fifth Day of March, 2024

*Katherine Kelly Vidal*
Katherine Kelly Vidal
*Director of the United States Patent and Trademark Office*